(12) United States Patent
Dong

(10) Patent No.: US 12,227,121 B1
(45) Date of Patent: Feb. 18, 2025

(54) HARNESS FOR EMERGENCY VEHICLE LIGHTS

(71) Applicant: Xin Dong, Bastrop, TX (US)

(72) Inventor: Xin Dong, Bastrop, TX (US)

(*) Notice: Subject to any disclaimer, the term of this patent is extended or adjusted under 35 U.S.C. 154(b) by 0 days.

(21) Appl. No.: 18/675,009

(22) Filed: May 27, 2024

Related U.S. Application Data

(60) Provisional application No. 63/595,324, filed on Nov. 1, 2023.

(51) Int. Cl.
| | | |
|---|---|---|
| *B60Q 1/00* | (2006.01) | |
| *F21V 23/00* | (2015.01) | |
| *B60Q 1/26* | (2006.01) | |
| *B60Q 1/28* | (2006.01) | |
| *B60Q 1/30* | (2006.01) | |

(52) U.S. Cl.
CPC .......... *B60Q 1/0094* (2013.01); *F21V 23/001* (2013.01); *B60Q 1/2611* (2013.01); *B60Q 1/28* (2013.01); *B60Q 1/30* (2013.01)

(58) Field of Classification Search
CPC ...... B60Q 1/0094; B60Q 1/2611; B60Q 1/28; B60Q 1/30; B60Q 1/52; B60Q 7/00; F21V 23/001
See application file for complete search history.

(56) References Cited

U.S. PATENT DOCUMENTS

| | | | | |
|---|---|---|---|---|
| 8,764,211 | B2* | 7/2014 | Fredrickson | B60R 16/0239 362/85 |
| 10,207,642 | B2* | 2/2019 | Bean | H01R 9/18 |
| 2003/0090153 | A1* | 5/2003 | Rhodes | B60R 16/0207 307/10.1 |
| 2004/0061446 | A1* | 4/2004 | Rhodes | B60R 16/0207 315/77 |
| 2017/0349093 | A1* | 12/2017 | Peacock | B60Q 1/0088 |
| 2020/0215962 | A1* | 7/2020 | Brower | H04L 12/4625 |
| 2020/0307445 | A1* | 10/2020 | Bader | H04W 4/80 |
| 2020/0381882 | A1* | 12/2020 | Byrne | H01R 13/46 |
| 2024/0059215 | A1* | 2/2024 | Natale | B60Q 1/305 |
| 2024/0138042 | A1* | 4/2024 | Walker | B60Q 1/2696 |

FOREIGN PATENT DOCUMENTS

GB        2505452        * 3/2014    .............. B60Q 1/00

* cited by examiner

*Primary Examiner* — Zheng Song
(74) *Attorney, Agent, or Firm* — NZ CARR LAW OFFICE

(57) ABSTRACT

Embodiments of the present disclosure relate to a modular, expandable and customizable harness assembly for vehicle lights. The harness assembly according to the present disclosure may be used to power and control emergency lights without using additional control circuit.

17 Claims, 37 Drawing Sheets

400

400

212p

212s

HARNESS FOR EMERGENCY VEHICLE LIGHTS

CROSS-REFERENCE TO RELATED APPLICATIONS

This application claims priority to U.S. Provisional Application Ser. No. 63/595,324 filed Nov. 1, 2023, which is incorporated by reference in its entirety.

FIELD

The present disclosure relates to harness and wiring arrangement for vehicle lights. Particularly, embodiments of the present disclosure relate to a plug-and-play harness and wiring arrangement for auxiliary vehicle lights, such as emergency lights, work lights, and auxiliary driving lights. More particularly, embodiments of the present disclosure provide modularized, customizable and expandable harness suitable for specialized vehicle lighting, such as emergency lighting.

BACKGROUND

Motor vehicles contain numerous lighting devices for both interior and exterior illumination. Vehicles come with standard lights to meet driving regulations and be road worthy. Specialty vehicles, such as emergency vehicles and work vehicles, need to be fitted with after-market lights, such as strobe lights or emergency flasher lights and hazard flasher lights. Traditionally, strobe lights installation is technical and tedious and would require both a vehicle mechanic and a vehicle electrician to complete the job. Harness for strobe lights need to be customized for each vehicle. A central controller is used to set, change, and control flash patterns.

BRIEF DESCRIPTION OF THE DRAWINGS

Embodiments of the present disclosure, briefly summarized above and discussed in greater detail below, can be understood by reference to the illustrative embodiments of the disclosure depicted in the appended drawings. It is to be noted, however, that the appended drawings illustrate only typical embodiments of this disclosure and are therefore not to be considered limiting of its scope, for the disclosure may admit to other equally effective embodiments.

Figure 1:
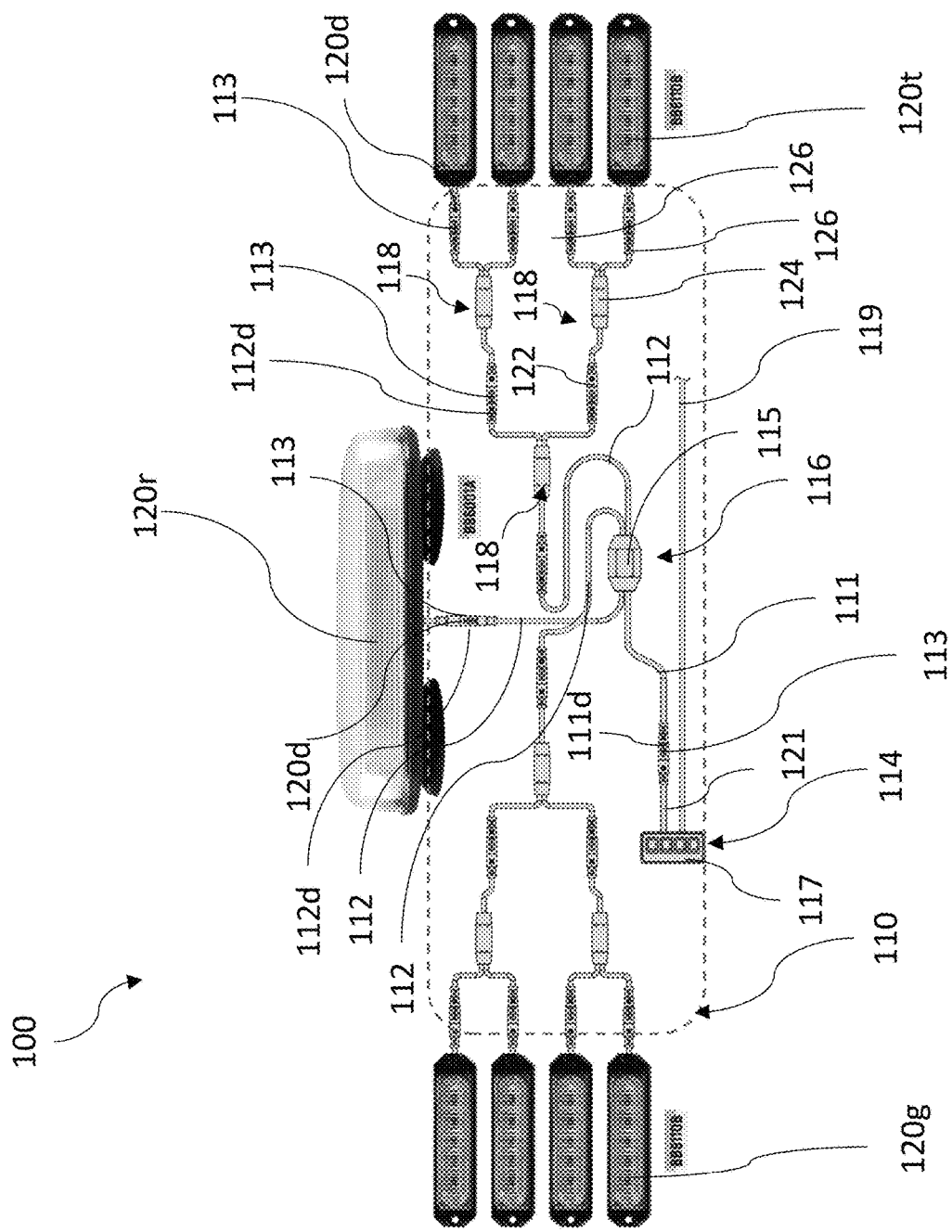
FIG. 1 schematically illustrates a plug and play emergency light harness kit according to the present disclosure.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present disclosure provide a plug and play vehicle light harness kit for installing after-market vehicle lights, such as emergency lights and work lights. In some embodiments, the plug and play vehicle light harness kit may be used to directly connect and control emergency lights on a vehicle without using complicated control panel. Embodiments of the present disclosure provide modular components, such as wiring hubs, controllers, splitters, to enable a customizable, modularized, and expandable vehicle light harness without needing to cutting, splicing, and prefabrication connection cables.

FIG. 1 schematically illustrate a plug and play vehicle light harness kit 100 according to the present disclosure. The vehicle light harness kit 100 may be installed on vehicles in a plug and play manner without needing to manually splice, solder, and arrange wires, therefore, greatly reduce labor cost for installation, maintenance, and overall cost of ownership. The vehicle light harness kit 100 may be used to provide power, for example from vehicle on board power supply, to after-market vehicle lights. The vehicle light harness kit 100 may also provide control signals to the vehicle lights, either by switches in a controller or by wiring, thus, without involving complicated control systems.

FIG. 1 is a schematic layout view of a vehicle light assembly 100 configured to install on a vehicle. The vehicle light assembly 100 includes a harness kit 110 and one or more vehicle lights 120 operable to be powered and controlled by the harness kit 110. The harness kit 110 and the vehicle lights 120 may be mixed and matched to achieve various lighting functions. The vehicle light assembly 100 may be used to add special lighting functions, such as providing emergency/warning signals, providing work lights or additional driving lights, or decorative lights, to a vehicle. Depending on the intended function of the vehicle light assembly 100, the one or more vehicle lights 120 may include emergency lights, also referred to as strobe lights, work lights, driving lights, or decorative lights, or any suitable lights. Depending on the installing locations of the vehicle lights 120 may include one or more roof lights 120r configured to install on a roof of a vehicle, one or more grille lights 120g configured to install on a front end of a vehicle, and one or more tail lights 120t configured to install on a rear end of a vehicle. In some embodiments, the vehicle light assembly 100 may also include some brackets for mounting the lights 120 to different locations of a vehicle.

In the example of FIG. 1, the vehicle light assembly 100 includes one roof light 120r, four grille lights 120g, and four tail lights 120t. However, less or more lights of different combinations may be selected according to desired light function. The harness kit 110 may also be configured according to the combination of the light selection.

In some embodiment, the harness kit 110 may include a wiring hub 116 for connecting one or more vehicle lights 120. The wiring hub 116 may include a junction box 115 and two or more cables extending from the junction box 115. In some embodiments, the wiring hub 116 may include a power cable 111 and one or more light cables 112 extending from the junction box 115. The power cable 111 may be configured to connect with a power supply. In some embodiments, the power cable 111 may further include one or more signal wires for pattern selection, synchronization control, color selection, or other functions. Each of the light cables 112 is configured to connect with a vehicle light to provide electrical power and control signals. Each of the power cable 111 and light cables 112 may include multiple wires configured to supply electrical power and provide control signals, such as pattern selection, color selection, and/or synchronization, to the vehicle lights 120.

As shown in FIG. 1, the wiring hub 116 include one power cable 111 and three light cables 112. The three light cables 112 are configured to connect with the roof lights 120r, the tail lights 120t, and the grill lights 120g respectively. The wiring hub 116 includes pre-manufactured wire arrangement configured to provide electrical communications from the wires of the power cable to the light cables 112. In some embodiments, the pre-manufactured wire arrangement in the wiring hub 116 enables drive and control of vehicle lights, such as emergency vehicle lights, connected downstream to the light cables 112 without needing any external control circuits. In some embodiments, the pre-manufactured wire arrangement in the wiring hub 116 achieves drive and control functions using direct wiring connections without additional circuit components, such as switches, timers, processors, or the like.

In some embodiments, each light cable 112 includes a ground wire, at least one function voltage wire, and at least one signal wire. The ground wire is configured to connect with the ground wire of a vehicle light. Each of the function voltage wire is configured to provide power supply to function voltage wires of a vehicle light. Each of the signal wire is configured to connect with a signal wire of a vehicle light.

The power cable 111 includes a ground wire, at least one function wire, and at least one signal wire. In some embodiments, the power cable 111 and the light cables 112 have the same number of wires. In other embodiments, the power cable 111 may include more function voltage wires and/or more signal wires than the light cables 112, thereby, enabling independent drive and/or control to the vehicle lights connected to different light cables 112.

In some embodiments, the wire arrangement in the wiring hub 116 includes circuit paths connecting the ground wires, the signal wires, and the functional voltage wires between the power cable 111 and the light cables 112. The wire arrangement enables direct control from the power cable 111 to the vehicle lights attached to the light cables 112. In some embodiments, the wire arrangement includes a ground wire circuit path, at least one signal wire circuit path, and at least one function voltage circuit path. The ground wire circuit path is configured to connect the ground wire of the power cable 111 to the ground wires of the power cables 112. Each of the signal circuit path is configured to connect a signal wire of the power cable 111 to signal wires of one or more of the power cables 112. Each of the voltage circuit path is configured to connect a function voltage wire of the power cable 111 to functional voltage wires of one or more of the power cables 112.

In some embodiments, each of the power cable 111 and the light cables 112 includes a socket or plug at a distal end 111d/112d from the junction box 115. In some embodiments, the distal ends 112d of the light cables 112 are identical in design and configured to connect with the a matching plug/socket at a distal end 120d of the vehicle light 120. The distal end 112d of the light cable 112 and the distal end 120d of the vehicle light 120 are may be connected in a plug-and-play manner forming a cable joint 113, which may be a modular joint in any suitable form. In some embodiments, the cable joint 113 is a socket-plug joint. In some embodiments, the distal end 111d of the power cable 111 may have the identical design as the distal end 112d of the light cables 112. Alternatively, the distal end 111d of the power cable 111 may be a pig tail configured to have wires manually connected to an external power supply and/or controller.

In some embodiments, the harness kit 110 may include a controller 114. In some embodiments, the controller 114 may include a switch box 117, an input cable 119 and an output cable 121. The input cable 119 and the output cable 121 extend from the switch box 117. The input cable 119 is configured to connect with a power supply. In some embodiment, the input cable 119 may be a pig tail configured to connect with the on board power source of the vehicle. Alternatively, a distal end of the input cable 119 may have a plug configured to connect with a socket of a suitable power supply. The output cable 114 is configured to connect with the power cable 111 of the wiring hub 116. In some embodiments, the output cable 114 may include a socket/plug configured to be connected to the power cable 111 in a plug-and-play manner. As shown in FIG. 1, the cable joint 113 is formed between the power cable 111 of the wiring hub 116 and the output cable 121 of the controller 114.

The switch box 117 may include one or more switches configured to selectively supply an electrical power connected to the input cable 119 to different wires in the output cable 121. In other words, the switch box 117 is configured to drive and control the vehicle lights. The output cable 121 is then connected to the wiring hub 116, for example, to the power cable 111 of the wiring hub 116. The power and control signal is then delivered to the vehicle lights 120 through the power cables 112 of the wiring hub 116.

As discussed above, each of the power cable 112 is configured to connect with a vehicle light at the distal ends 112d. In some embodiments, a vehicle light may be directly connected to the light cable 112. For example, in FIG. 1, the roof light 120r is directly connected to one of the light cable 112 at the distal end 112d.

In some embodiments, the harness kit 110 may include optional one or more splitter cables 118. The splitter cables 118 may be connected to the distal ends 112d of the light cables 112 to enable two or more vehicle lights 120 to be driven by one light cables 112. The splitter cable 118 may include an input cable 122, a wiring box 124, and two or more output cables 126. The input cable 122 and the output cables 126 extend from the wiring box 124. A distal end of the input cable 122 may include a plug/socket, identical to the plug/socket of the vehicle light 120, configured to mate with the distal end 112d of the vehicle cable 112. A distal end of each of the output cable 126 may include a socket/plug, identical to the socket/plug at the distal end 112d, which is configured to mate with the vehicle lights 120. An output cable 126 of one splitter cable 118 may be connected to an input cable 122 of another splitter cable 118 to achieve multiple level splitting.

In FIG. 1, four tail lights 120*t* are connected with one light cable 112 through two levels of splitter cables 118. Particularly, an input cable 122 of a first splitter cable 118 is connected to one light cable 112, and a second splitter cable and a third splitter cable are connected to two output cables 126 of the first splitter cable 118 respectfully. The tail lights 120*t* are connected to the output cables 126 of the second and third splitter cables 118. During operation, the four tail lights 120*t* are controlled by a single light cable 112 from the wiring hub 116, thus, operating in identical and synchronized lighting patterns. Similarly, the grille lights 120*g* are connected to one light cable 112 via three splitter cables 118.

Using the splitter cables 118 also allows multiple lights to share a partial common electrical path, thus, avoid bulky wire bundles along the vehicle body. The splitter cables 118 allow multiple vehicle lights to be driven and controlled by a single light cable 112 extending from the wiring hub 116, thereby allowing the multiple vehicle lights to be synchronized without complicated control circuits. Government regulations and standards sometime require vehicle lights to be synchronized. For example, strobe lights need to be synchronized in certain manner to convey standard signals. Synchronization is traditionally achieved using a central control circuit connected to all related vehicle lights. Wiring and operating the central control circuit are both complicated and costly. Using the splitter cables 118 enables synchronization with straight forward installation and operation with a low cost of ownership.

By using a uform socket/plug joint scheme, for example, as in the cable joints 113, components of the vehicle light assembly 100 are modularized.

Wiring hubs, such as the wiring hub 116, may be arranged and wired to achieve custom functions. Similarly, if a controller, such as the controller 114, is used in a vehicle light assembly, custom functions may be achieved in design and wiring of the controller. Vehicle light assembly according to the present disclosure, such as the vehicle light assembly 100, may be customized by selecting a wiring hub from wiring hubs of various designs, and/or by selecting a controller of particular design, and/or selecting vehicle lights of various function.

Vehicle light assemblies according to the present disclosure are also expandable, for example using one or more splitter cables and additional vehicle lights.

Exemplary wiring hubs, controllers, and splitter cables are described to demonstrate the concept of modularized, customizable, and expandable vehicle light assembly according to embodiments of the present disclosure.

FIGS. 2A-2H schematically illustrate a wiring hub 200 according to embodiments the present disclosure. The wiring hub 200 may be used in place of the wiring hub 116 in the vehicle light assembly 100 of FIG. 1. Depending on the wiring design, the wiring hub 200 may be used alone with vehicle lights.

Figure 2A:
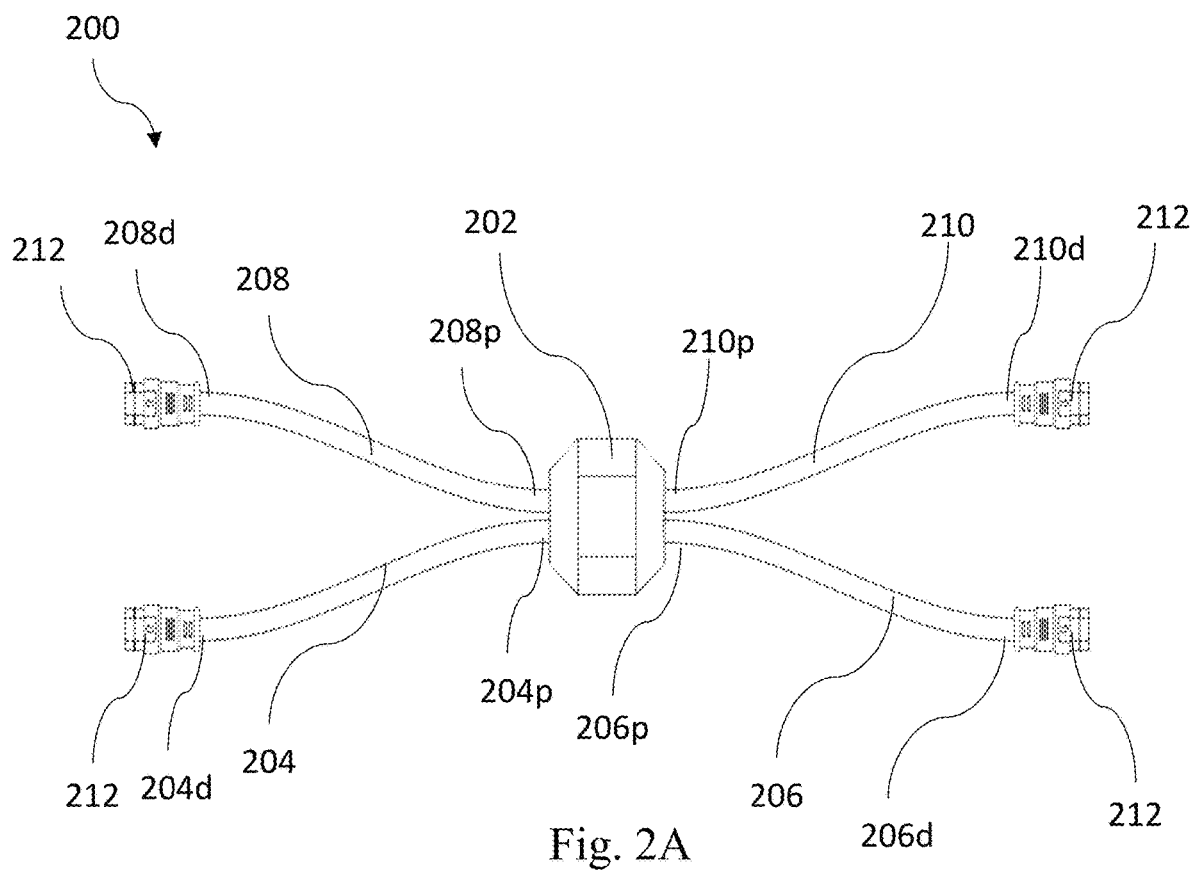
FIGS. 2A-2H schematically illustrate a harness kit according to embodiments the present disclosure.

FIG. 2A is a schematic plan view of the wiring hub 200. The wiring hub 200 includes a junction box 202. A power cable 204 extends from the junction box 202. The power cable 204 is configured to connect with a power supply. Light cables 206, 208, 210 extend from the junction box 202. Each of the light cables 206, 208, 210 is configured to connect with a vehicle light to control and drive the vehicle light. It should be noted that less and more light cables may be included in the wiring hub 200 depending on the design. For example, the wiring hub 200 may include one, two, four, five, and more light cables extending from the junction box 202.

In some embodiments, the light cables 206, 208, 210 may be selected according to the vehicle lights to be connected. For example, the light cables 206, 208, 210 may include the same number of cores (or wires) as the extension cable of the vehicle lights to be connected. In some embodiments, the power cable 204 includes the same number of cores as the light cables 206, 208, 210. In some embodiments, the power cable 204 and the light cables 206, 208, 210 are identical cables. In other embodiments, the power cable 204 includes the same number of cores as the light cables 206, 208, 210 but has thicker wires to accommodate larger current. Selecting cables with the same number of cores enables modular design.

As shown in FIG. 2A, the vehicle cable 206/208/210 has a proximate end 206*p*/208*p*/210*p* connected to the junction box 202 and a modular connector 212 formed on a distal end 206*d*/208*d*/210*d*. The modular connector 212 enables the vehicle cable 206/208/210 to connect with and drive any vehicle lights with the matching connector. In some embodiments, the modular connector 212 may be a socket or a plug configured to form a socket-plug joint.

In some embodiments, the power cable 204 has a proximate end 204*p* connected to the junction box 202 and a modular connector 212 formed on a distal end 204*d*. Using the modular connector 212 allows the power cable 204 to expand with additional components, such as a controller, in the modular scheme by a simple plug-and-play operation. In some embodiments, a pig tail cable with a matching socket may be connected to the distal end 204*d* of the power cable 204 to enable individual wire handling.

In some embodiments, the light cables 206, 208, 210 have different lengths for installing vehicle lights at different locations in a vehicle. For example, the light cables 206, 208, 210 may be selected in different lengths for connecting to vehicle lights installed at tail, grille, and roof on a vehicle. The different lengths may reduce cost and avoid bulkiness from extra lengths of cables. In other embodiments, the light cables 206, 208, 210 may have the same length. In yet another embodiment, the power cable 204 and the light cables 206, 208, 210 may be identical in length, thus, providing a simple solution to drive the vehicle lights.

Even though the light cables 206, 208, 210 and the power cable 204 are directly extending from the housing 202, the housing 202 may include one or more sockets to connect the light cables 206, 208, 210 and the power cable 204 with circuit paths 226 in the housing 202.

Figure 2B:
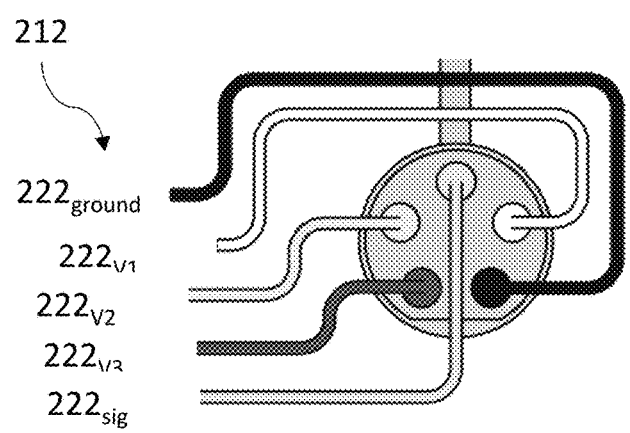

FIG. 2B is schematic view of the modular connector 212 according to embodiments of the present disclosure. The modular connector 212 includes five cores corresponding to wiring scheme of vehicle lights to be used in the modular connection. The modular connector 212 include five wires 222*ground*, 222*sig*, 222*v*1, 222*v*2, 222*v*3 (collectively 222). The wire 222*ground* is a ground wire, positioned to connect with a vehicle ground wire in a vehicle light. The wire 222*sig* is a signal wire positioned to connect with the signal wire, such as the pattern selection wire, color selection wire, and/or synchronization control, in a vehicle light. The wires 222*v*1, 222*v*2, 222*v*3 are function voltage wires, positioned to connect with the corresponding function voltage lines of a vehicle light. In a strobe light designs, when a positive voltage is supplied to the strobe light via a function voltage line, the strobe light lights up in a strobe pattern predesignated to the function voltage line. The three function voltage wires 222*v*1, 222*v*2, 222*v*3 allow the wiring hub 200 to activate up to three pre-designed strobe patterns without programming the vehicle lights.

It should be noted that the modular connector 212 is provided as an example. Any suitable cable arrangements are within the scope of the present disclosure. For example, the modular connector 212 may include three cores for a ground wire, a signal wire, and a function voltage wire. In other example, the modular connector 212 may include six cores to allow a fourth function voltage wire. In some embodiments, the modular connector 212 may include more than one signal wires, for example, two modular connectors 212 may include a first signal wire for pattern selection and a second signal wire for synchronization or color selection.

Wires of the power cable 204 and the light cables 206, 208, 210 are connected according to the circuit design in the junction box 202. The wires may be connected in various designs according to the desired function.

Figure 2C:
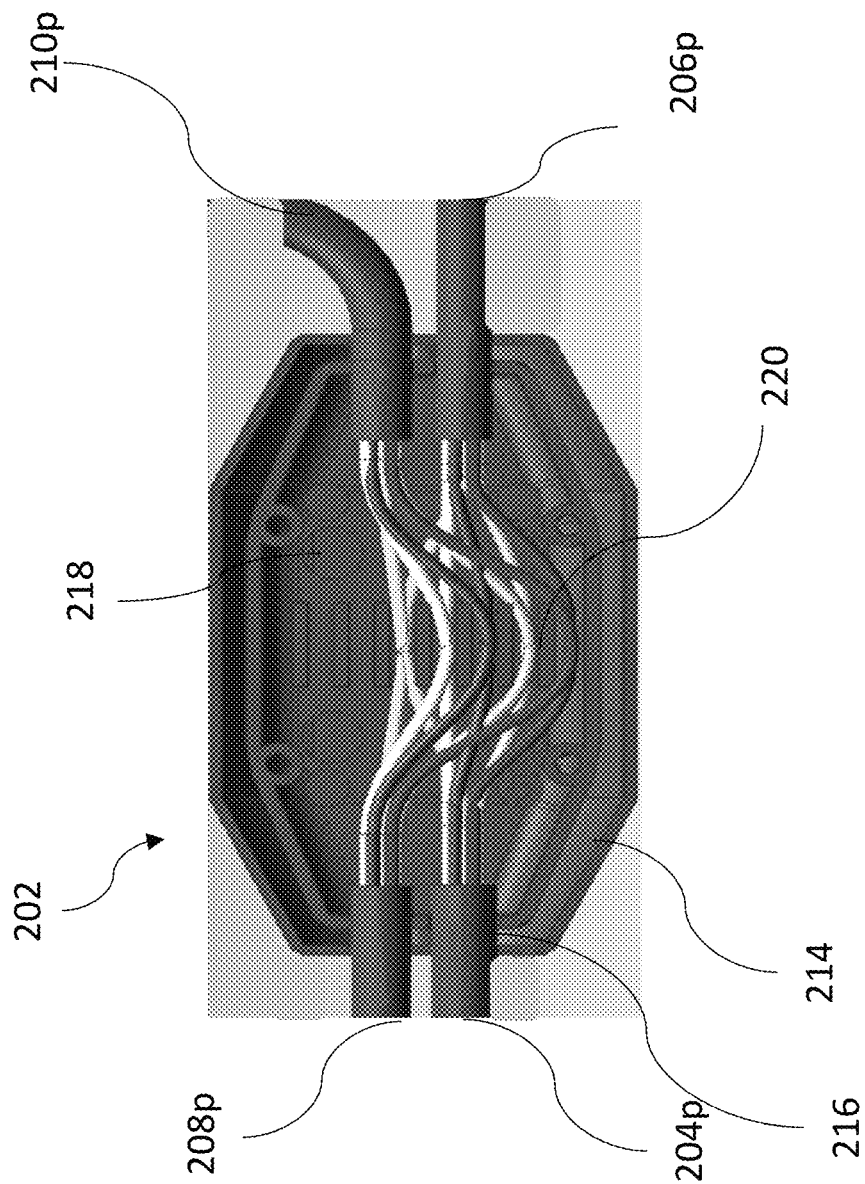
Figure 2D:
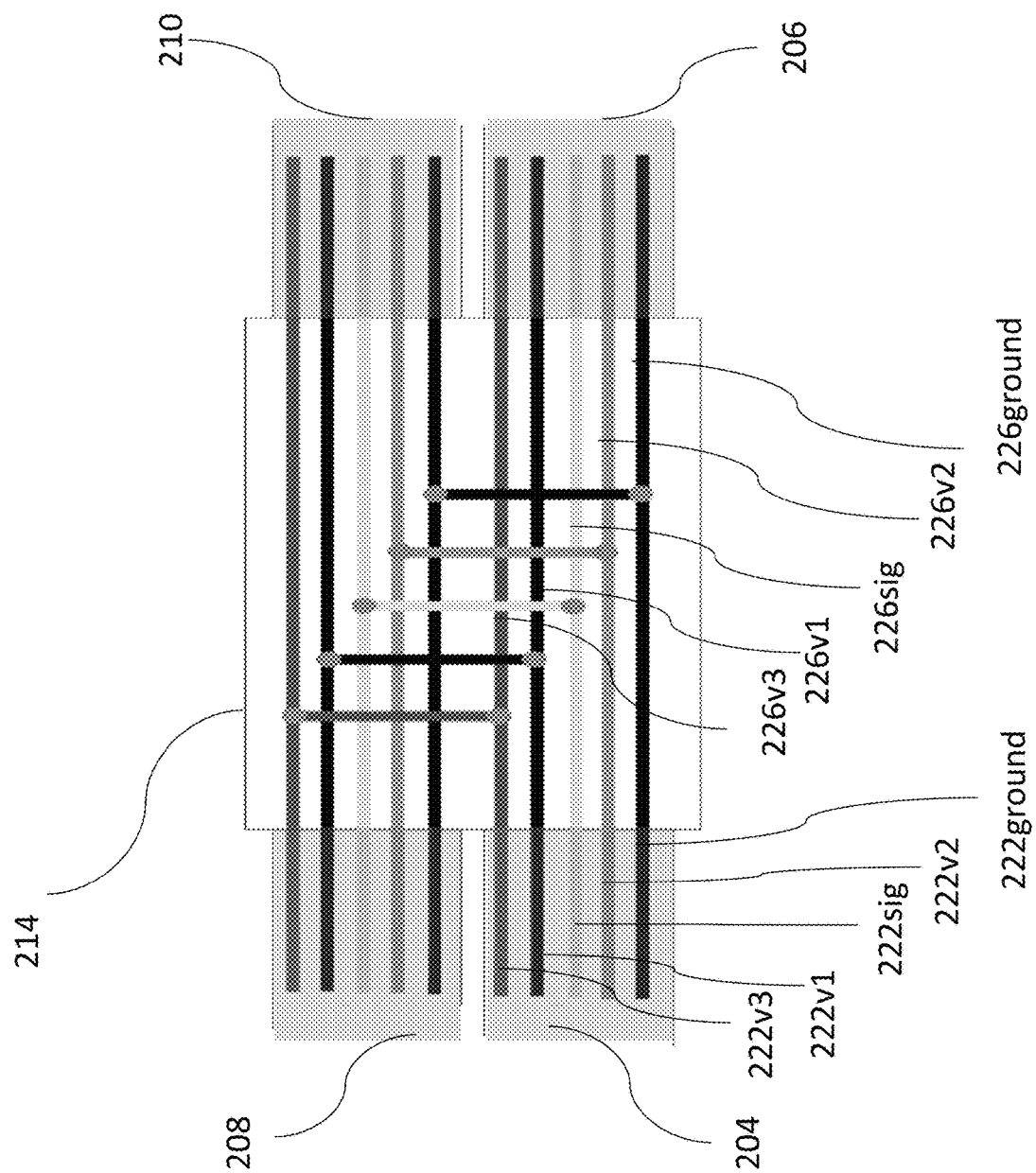

FIGS. 2C-2D demonstrate a wire connection design in the junction box 202 according to one embodiment of the present disclosure. FIG. 2C is a schematic view of the junction box 202 during the process of fabrication. As shown in FIG. 2C, the junction box 202 may include a housing 214 configured to retain and secure wire connections therein. The housing 214 may include an upper housing and a lower housing. Only the lower housing is shown in FIG. 2C to demonstrate the wire connections. The housing 214 defines an inner volume 218. Cable openings 216 are formed through the housing 214. In some embodiments, the cable openings 216 may be notches formed through the upper housing and lower housing.

In some embodiments, a plurality of wire organizers 220 may be formed within the inner volume 218. The wire organizers 220 form narrow gaps in between. Each gap may be sized to secure a group of connected wires therein. As shown in FIG. 2C, wires that are not connected to each other are disposed at different gaps, separated by the organizers 220. In some embodiments, the wire organizers 220 may be a plurality of wall segments arranged in parallel. In some embodiment, the wire organizers 220 may be disposed along a middle portion of the housing 214. It should be noted that the wire organizers 220 may be other suitable structures, such as poles, hooks, and the like, to secure the connected wires in place.

During fabrication, outer sheaths of the power cable 204 and the light cables 206, 208, 210 may be first removed from the proximal ends 204$p$, 206$p$, 208$p$, 210$p$ respectively to expose the individual wires. The individual wires are then connected according to the wire design. The power cable 204 and the light cables 206, 208, 210 are secured to the lower housing, as shown in FIG. 2C, with the proximal ends 204$p$, 206$p$, 208$p$, 210$p$ disposed through the cable openings 216 and each connected group of wires positioned in the wire organizers 220. The upper housing is then secured to the lower housing so that the connected wires are secured in the inner volume 218 in the housing 214. In some embodiments, a sealing material may be injected into the inner volume 218. When the sealing material is cured in the inner volume, the wire connections are further secured with isolation material disposed between non-connected wires for further isolation. In some embodiments, the sealing material may be a polymer, such as epoxy resin.

FIG. 2D is a wiring circuit of in the junction box 202 shown in FIG. 2C. Wires of the power cable 204 are connected to circuit paths 226 formed in the junction box 202. In the wiring design of FIGS. 2C-2D, each of the power cable 204 and the light cables 206, 208, 210 includes five wires, i.e. the ground wire 222$ground$, the signal wire 222$sig$, and the function voltage wires 222$v$1, 222$v$2, 222$v$3. The wiring circuit includes a ground circuit path 226$ground$, three voltage circuit paths 226$v$1, 226$v$2, 226$v$3, and a signal circuit path 226$sig$ (collective wire paths 226). In some embodiments, the circuit paths 226 are formed by joining corresponding wire of the power cable 204 with the corresponding wires of the light cables 206, 208, 210 without additional electrical components.

As shown in FIG. 2D, the ground circuit path 226 connects the ground wires 222$ground$ of the power cable 204 and the light cables 206, 208, 210 together; the signal circuit path 226$sig$ connects the signal wires 222$sig$ of the power cable 204 and the light cables 206, 208, 210 together; the voltage circuit path 226$v$1 connects the function voltage wires 222$v$1 of the power cable 204 and the light cables 206, 208, 210 together, the voltage circuit path 226$v$2 connects the function voltage wires 222$v$2 of the power cable 204 and the light cables 206, 208, 210 together; and the voltage circuit path 226$v$3 connects the function voltage wires 222$v$3 of the power cable 204 and the light cables 206, 208, 210 together.

Using the wire connection of FIGS. 2C-2D, all the vehicle lights connected to the power cables 206, 208, 210 subject to the same control, and may be turned on and off, and strobe at the same pattern. The wire connection design in FIGS. 2C-2D provides a straight forward installation process and control scheme, and may be used in situations when simple strobe patterns are needed.

Figure 2E:
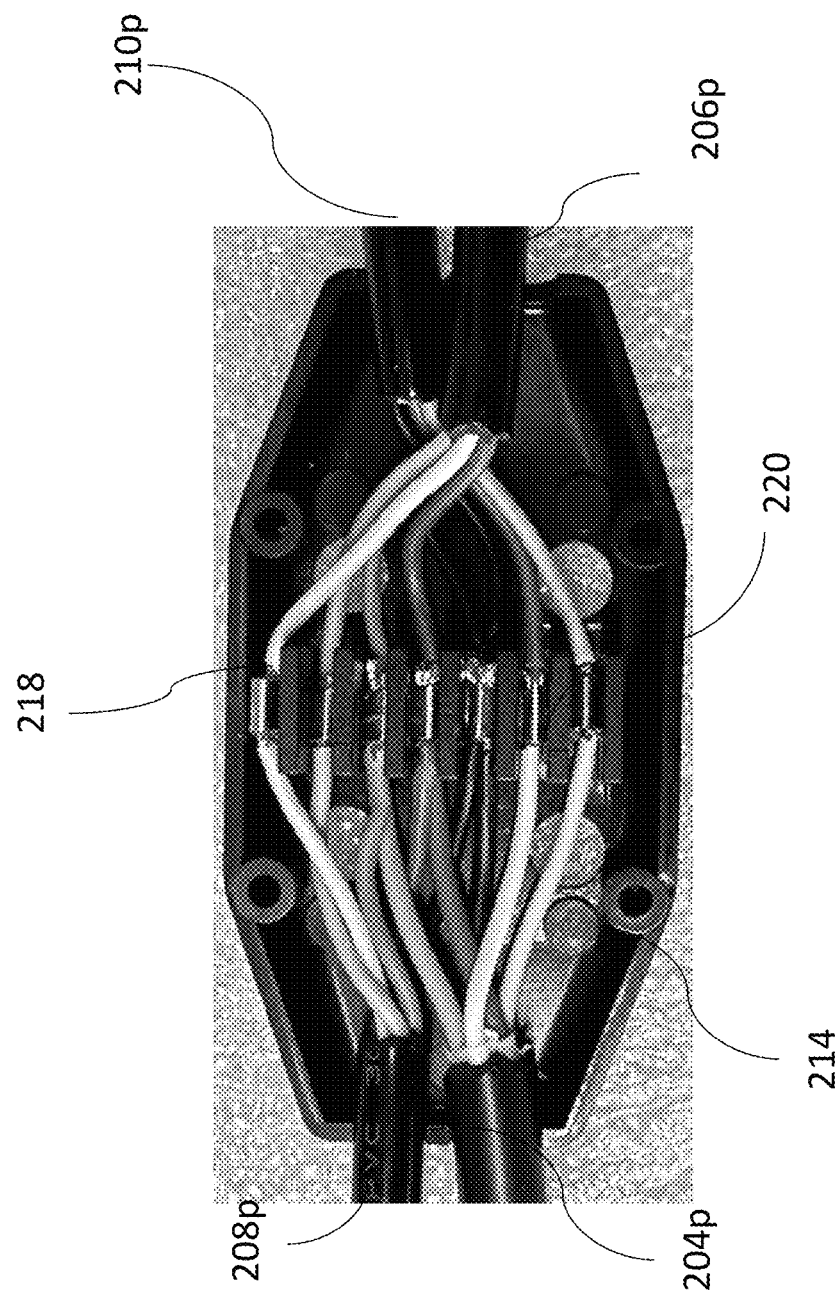
Figure 2F:
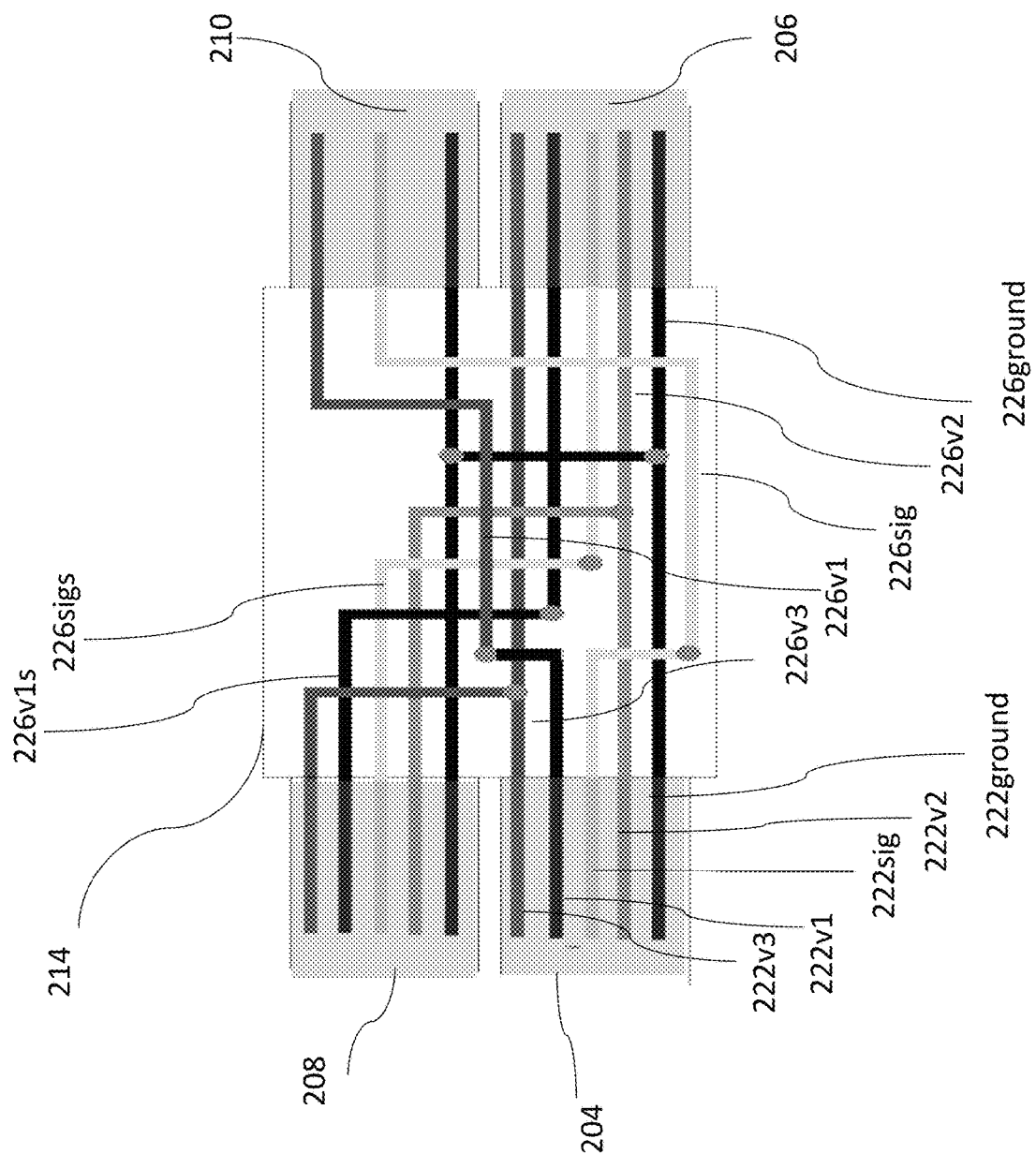

FIGS. 2E-2F demonstrate a wire connection design in the junction box 202 according to another embodiment of the present disclosure. FIG. 2E is a schematic view of the junction box 202 during the process of fabrication. FIG. 2F is a wiring circuit of in the junction box 202 shown in FIG. 2E.

In the wiring design of FIGS. 2E-2F, each of the power cable 204 and the light cables 206, 208 includes five wires, i.e. the ground wire 222$ground$, the signal wire 222$sig$, and the function voltage wires 222$v$1, 222$v$2, 222$v$3. The light cable 210 includes three wires, a ground wire 222$ground$, a signal wire 222$sig$, and one function voltage wire 222$v$3. However, the light cable 210 may include the same wire configuration of the power cable 204 and the light cables 206, 208.

The ground circuit path 226$g$ connects the ground wires 222$ground$ of the power cable 204 and the light cables 206, 208, 210 together. The signal circuit path 226$sig$ connects the signal wire 222$sig$ of the power cable 204 to the signal wire 222$sig$ of the light cable 210. The wiring design in FIG. 2F further includes a supplemental signal wire circuit path 226$sig$ s which connects the signal wires 222$sig$ of the light cables 206 and 208 together.

The voltage circuit path 226$v$1 connects the function voltage wire 222$v$1 of the power cable 204 to the function voltage wire 222$v$3 of the light cable 210. In some embodiments, the wiring deign of FIG. 2F includes a supplemental voltage circuit path 226$v$1 s connects the function voltage wires 222$v$1 of the light cables 206 and 208 together.

The voltage circuit path 226$v$2 connects the function voltage wire 222$v$2 of the power cable 204 to the function voltage wires 222$v$2 of the light cables 206, 208. The voltage circuit path 226$v$3 connects the function voltage wire 222$v$3 of the power cable 204 to the function voltage wires 222$v$3 of the light cables 206, 208.

The wiring design of FIGS. 2E-2F applies a first scheme to control lights connected to the light cables 206, 208, and applies a second scheme to control lights connected to the light cable 210.

Particularly, two voltage function wires 222v3, 222v2 of the power cable 204 are dedicated to drive the lights connected to the light cables 206, 208 via the voltage circuit paths 226v3, 226v2. That is to say the lights connected to the light cables 206, 208 may strobe in two alternative patterns. When a voltage is applied to the voltage function wire 222v2, the lights connected to the light cables 206, 208 strobe according to a first pre-designated pattern associated with the voltage function wire 222v2 on the on board controllers in the each light. Similarly, when a voltage is applied to the voltage function wire 222v3, the lights connected to the light cables 206, 208 strobe according to a second pre-designated pattern associated with the voltage function wire 222v3 on the on board controllers in the each light. The tied-up signal wires 222sig of the light cables 206, 208 ensures the lights connected to the light cables 206, 208 synchronize with one another.

The voltage function wire 222v1 and the signal wire 222sig of the power cable 204 are dedicated to drive the lights connected to the light cable 210. When a voltage is applied to the voltage function wire 222v1, the lights connected to the light cable 210 strobe according to a pre-designated pattern associated with the voltage function wire 222v1 on the on board controllers in the light attached to the light cable 210. The pre-designated pattern may be changed by applying a vehicle voltage to the signal wire 222sig of the power cable 204.

In some embodiments, the light cables 206, 208 may be used to connect grille lights and tail lights respectively while the light cable 210 may be used to connect a bar light on the roof. In the wiring design of FIGS. 2C-2D, all the lights connected to the light cables 206, 208, 210 are on and off at the same time even. In the wiring design of FIGS. 2E-2F, lights connected to the light cable 210 may be independently driven and controlled from lights connected to the light cables 206, 208. In the situations where roof lights need different lighting styles from grille lights and tail lights, the wiring design of FIGS. 2E-2F provides a simple yet practical solution.

Figure 2G:
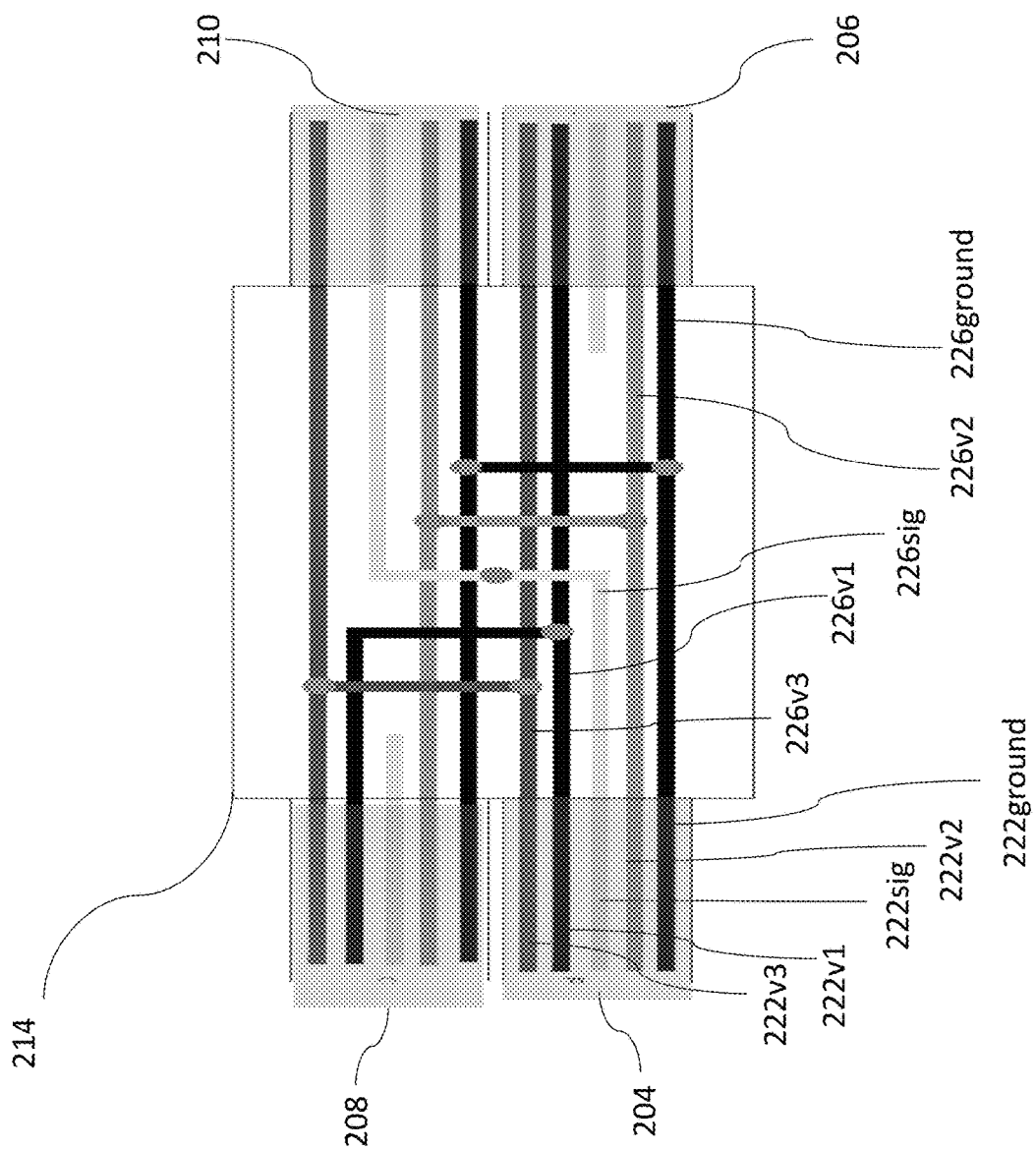

FIG. 2G is a wiring circuit according to another embodiment. In the wiring design of FIG. 2G, each of the power cable 204 and the light cables 206, 208 includes five wires, i.e. the ground wire 222ground, the signal wire 222sig, and the function voltage wires 222v1, 222v2, 222v3. The light cable 210 includes four wires, the ground wire 222ground, the signal wire 222sig, and two function voltage wires 222v2, 222v3.

The ground circuit path 226 connects the ground wires 222ground of the power cable 204 and the light cables 206, 208, 210 together; the signal circuit path 226sig connects the signal wires 222sig of the power cable 204 and the light cables 210 together; the voltage circuit path 226v1 connects the function voltage wires 222v1 of the power cable 204 and the light cables 206, 208 together; the voltage circuit path 226v2 connects the function voltage wires 222v2 of the power cable 204 and the light cables 206, 208, 210 together; and the voltage circuit path 226v3 connects the function voltage wires 222v3 of the power cable 204 and the light cables 206, 208, 210 together. The signal wires 222sig of the power cable 208, 206 are floating.

Using the wire connection of FIG. 2G, the vehicle lights connected to the power cables 206, 208, 210 may be powered to at the same time, for example with the same pattern, using the voltage circuit path 226v2, 226v3. The vehicle lights connected to the power cable 206, 208, e.g. the grille lights and the tail lights, may be turned on independently from the lights connected to the power cable 210, e.g. the roof light. Using the function voltage wire 222v1 of the power cable 204 and the voltage circuit path 226v1, the lights connected to the power cables 206, 208 may be turned on without turning on the lights connected to the power cable 210. Using the signal wire 222sig n of the power cable 204 and the signal circuit path 226sig, the lights connected to the power cable 210 may change lighting pattern or phase without affecting the lights connected to the power cables 206, 208.

Figure 2H:
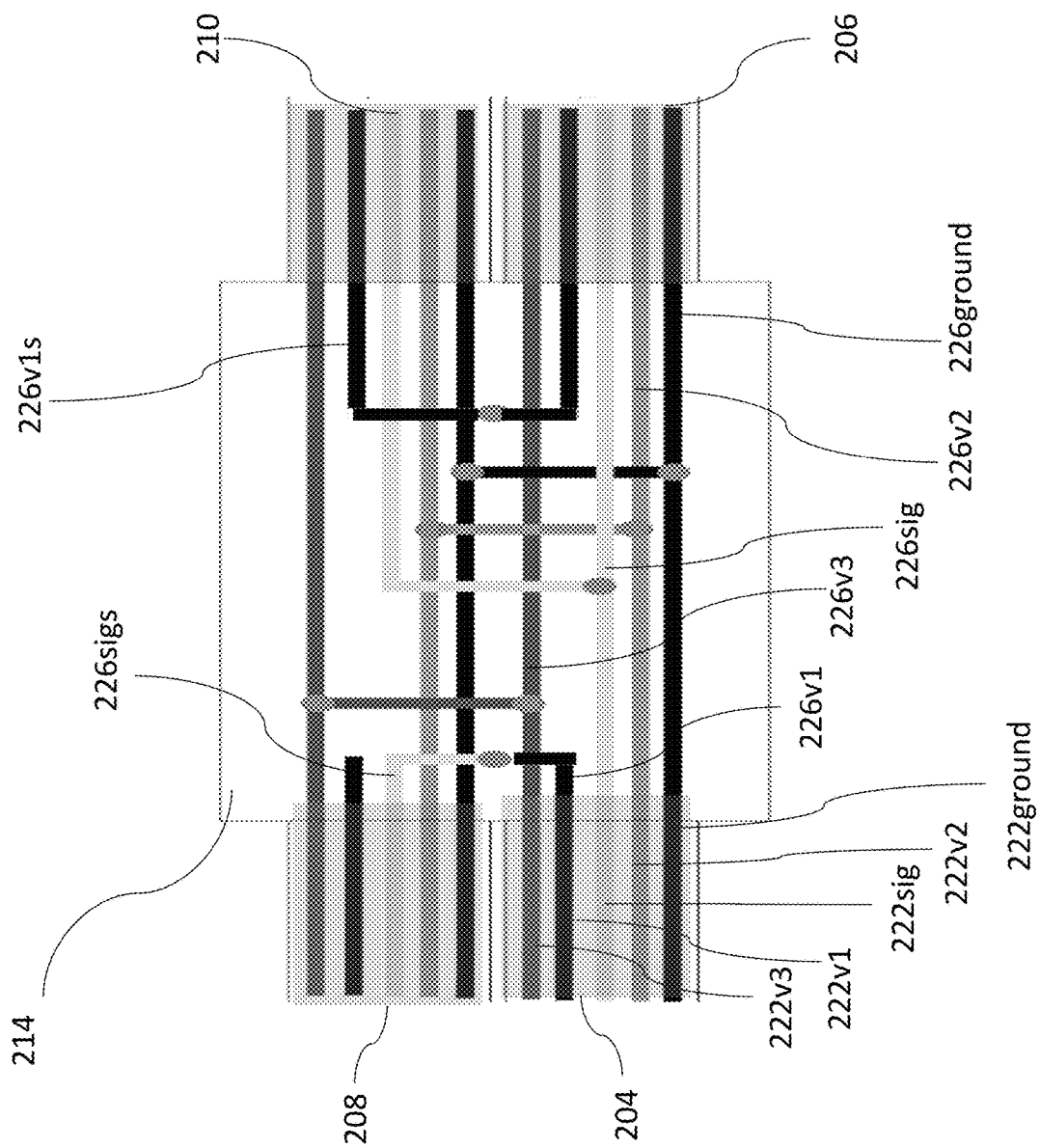

FIG. 2H includes a wiring circuit according to another embodiments of the present disclosure. In FIG. 2H, each of the power cable 204 and the light cables 206, 208, 210 includes five wires, i.e. the ground wire 222ground, the signal wire 222sig, and the function voltage wires 222v1, 222v2, 222v3.

The ground circuit path 226g connects the ground wires 222ground of the power cable 204 and the light cables 206, 208, 210 together. The signal circuit path 226sig connects the signal wire 222sig of the power cable 204 to the signal wires 222sig of the light cables 206, 210. The wiring design of FIG. 2H includes a supplemental signal wire circuit path 226sig s which connects the function voltage wire 222v1 of the power cable 204 to the signal wire 222sig of the light cables 208, therefore, allowing the functional voltage wire 222v1 in the power cable 204 as a signal wire.

The voltage circuit path 226v2 connects the function voltage wires 222v2 of the power cable 204 and the light cables 206, 208, 210 together. The voltage circuit path 226v3 connects the function voltage wires 222v3 of the power cable 204 and the light cables 206, 208, 210 together.

In some embodiments, the wiring deign of FIG. 2G includes a supplemental voltage circuit path 226v1s connects the function voltage wires 222v1 of the light cables 206 and 210 together.

Figure 3A:
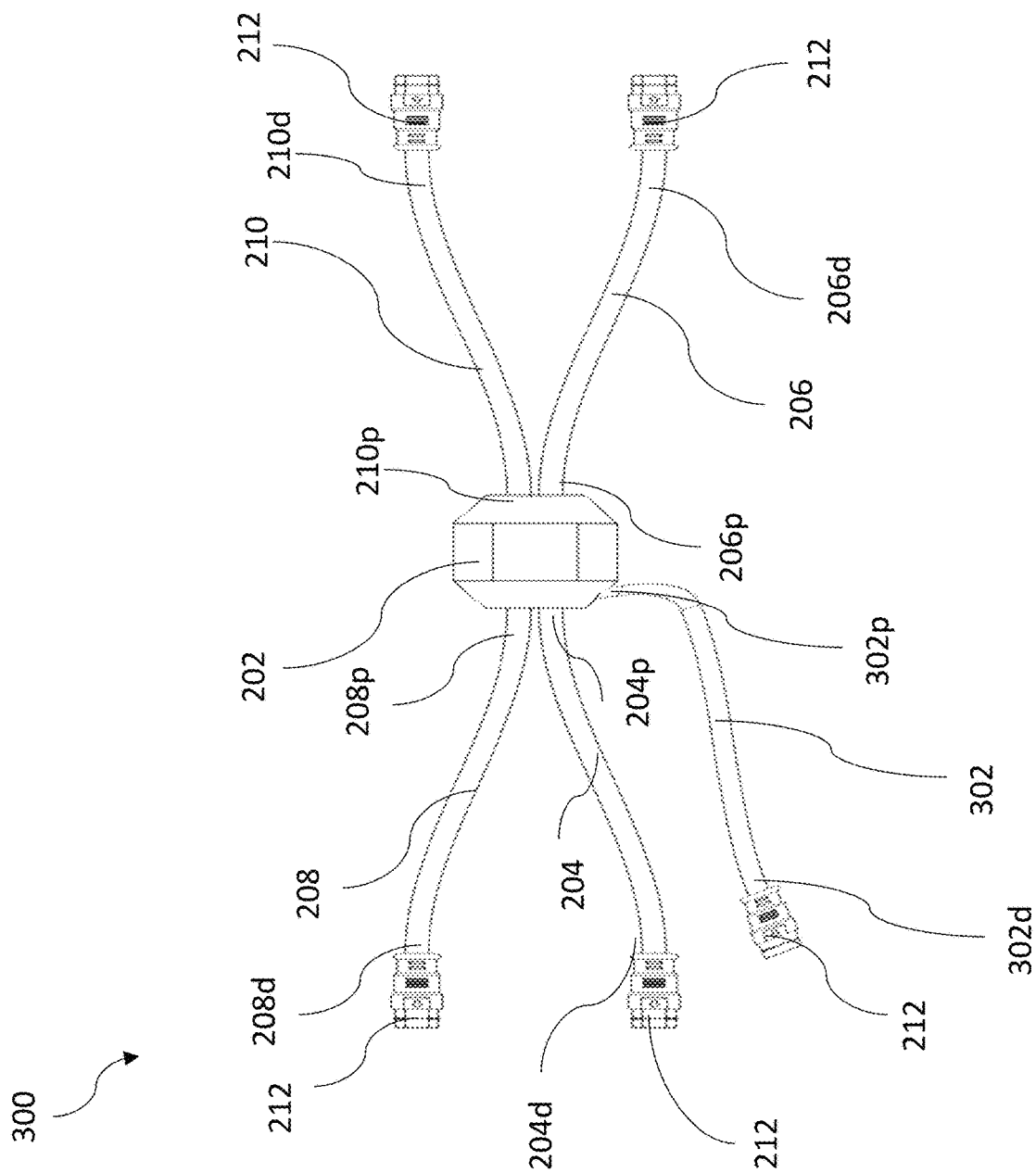
FIGS. 3A-3C schematically illustrate a harness kit according to embodiments of the present disclosure.
Figure 3B:
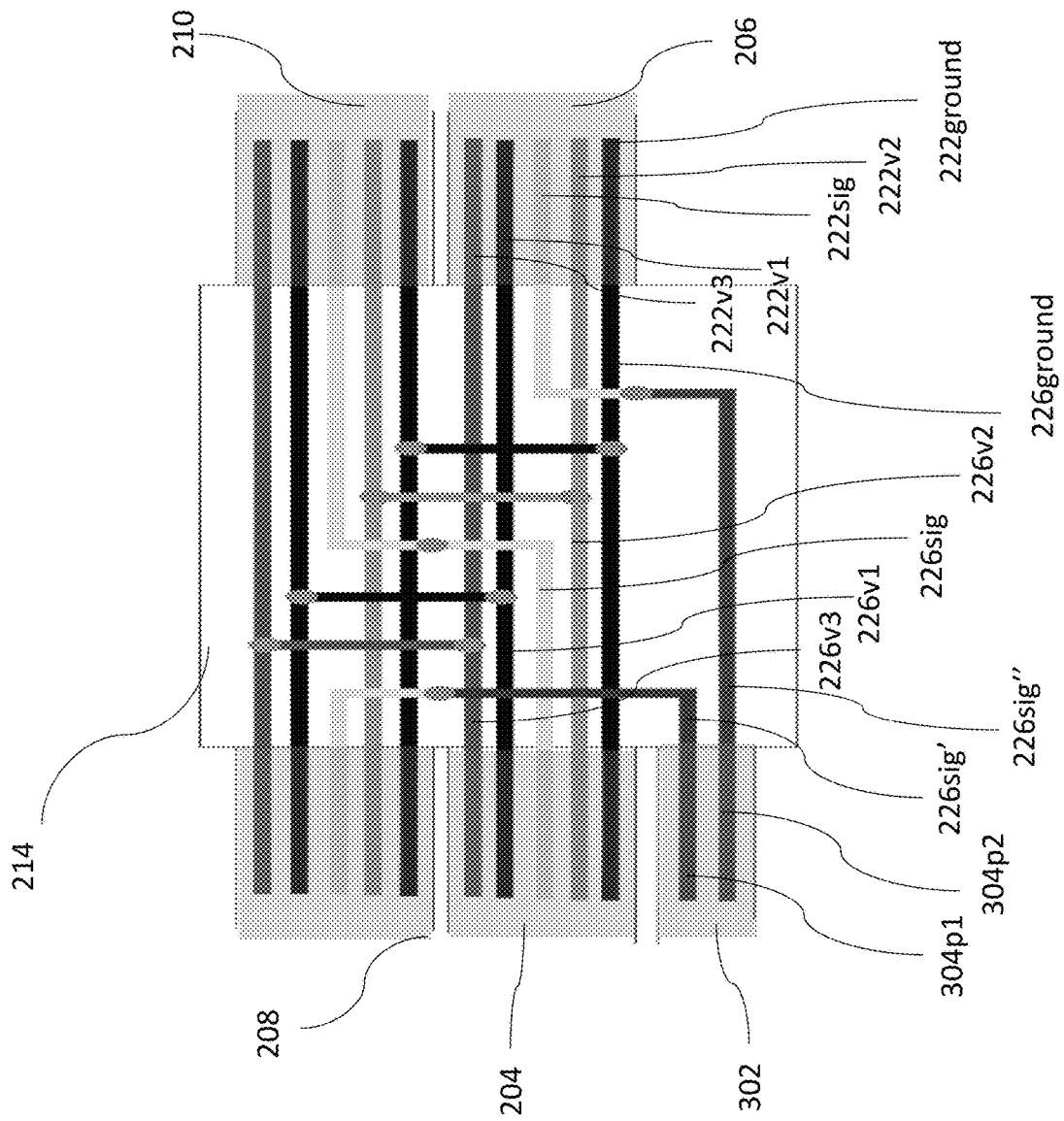
Figure 3C:
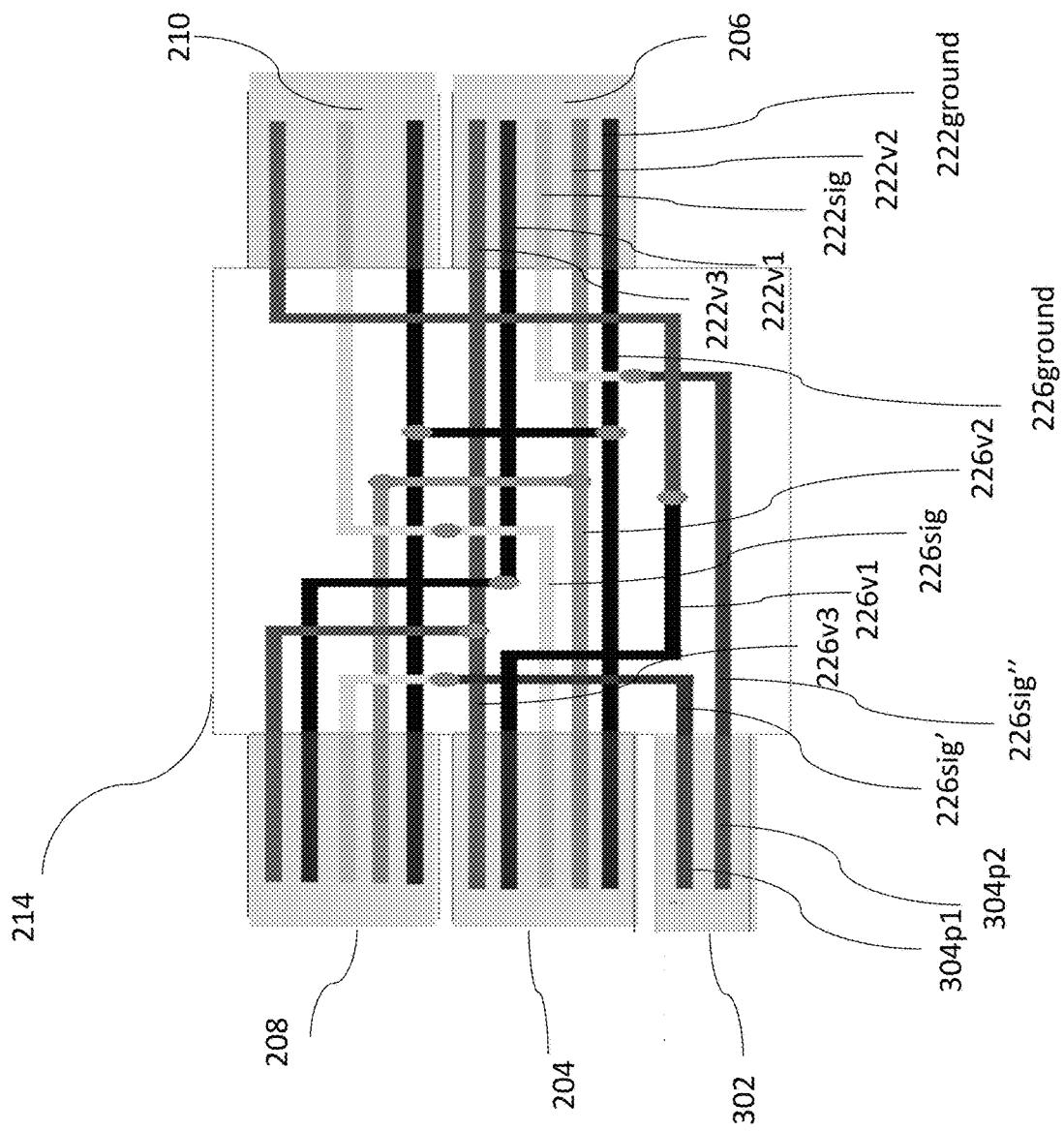

FIGS. 3A-3C schematically illustrate a wiring hub 300 according to embodiments of the present disclosure. The wiring hub 300 may be used in place of the wiring hub 116 in the vehicle light assembly 100 of FIG. 1. Depending on the wiring design, the wiring hub 300 may be used alone with vehicle lights.

FIG. 3A is a schematic plan view of the wiring hub 300. The wiring hub 300 is similar to the wiring hub 200 shown in FIG. 2A except that the wiring hub 300 further includes a signal cable 302 configured to provide additional signal delivery channels. The signal cable 302 has a proximal end 302p extending from the junction box 202. In some embodiments, the signal cable 302 includes the same number of cores as the light cables 206, 208, 210. In some embodiments, the signal cable 302, the power cable 204 and the light cables 206, 208, 210 are identical cables. A modular connector 212, such as a socket or a plug, may be attached to a distal end 302d of the signal cable 302 to enable plug-and-play connection to other components, for example, switch boxes. In other embodiments, the distal end 302d of the signal cable 302 may be a pig tail to allow direct connection.

Similar to the wiring hub 200, the wiring hub 300 may be designed to achieve different drive and control goals by selecting different wiring design. Using the one or more wires in the signal cable 302, the wiring hub 300 is able to provide independent control through each of the light cables 206, 208, 210 while still retaining the straightforward installation process and control scheme. FIGS. 3B-3C schematically illustrate two wiring design in the junction box 202 according to embodiments of the present disclosure.

The wiring design in FIG. 3B is similar to the wiring design in FIGS. 2C-2D except that the signal wires 222sig of the power cable 204 and the light cables 206, 208, 210 are not joined together. In FIG. 3B, the signal cable 302 is shown to include two signal wires 304p1 and 304p2, and two additional signal wire paths 226sig' and 226sig".

In the wiring design in FIG. 3B, the ground wires 222ground of the power cable 204 and the light cables 206, 208, 210 are joined together by the ground circuit path 226ground, the function voltage wires 222v1 of the power cable 204 and the light cables 206, 208, 210 are joined together by the voltage circuit path 226v1, the function voltage wires 222v2 of the power cable 204 and the light cables 206, 208, 210 are joined together by the voltage circuit path 226v2, and the function voltage wires 222v3 of the power cable 204 and the light cables 206, 208, 210 are joined together by the voltage circuit path 226v3.

The signal wire 222sig of the power cable 204 is connected to the signal wire 222sig of the light cable 210 by the signal circuit path 226sig, therefore, used to select strobe patterns in the lights connected with the light cable 210. The signal wire 304p1 of the signal cable 302 is connected to the signal wire 222sig of the light cable 208 by the signal circuit path 226sig', therefore, used to select strobe patterns in the lights connected with the light cable 208. The signal wire 304p2 of the signal cable 302 is connected to the signal wire 222sig of the light cable 206 by the signal circuit path 226sig", therefore, used to select strobe patterns in the lights connected with the light cable 206.

By adding the signal cable 302, the wiring hub 300 is able to provide independent control signals through each of the light cables 206, 208, 210 while still retaining the straight forward installation process and control scheme.

It should be noted that the signal cable 302 may include additional wires, such as the signal cable 302 may include the same number of wires as the light cables 206, 208, 210 and the power cable 204. The additional wires are not involved in the wiring design, therefore, not shown.

Even though two wires 304p1 and 304p2 are shown in FIG. 3B to provide control signals, less or more signal wires may be included in the wiring design when less and more light cables are included in the wiring hub 300, or less or more control consolidation is desired in the desired function.

The wiring design in FIG. 3C is similar to the wiring design in FIGS. 2E-2F except that the signal wires 222sig of the light cables 206 and 208 are not joined together. In FIG. 3C, the signal wires 304p1 and 304p2 of the signal cable 302 are connected to the signal wires 222sig of the light cables 208 and 206 via the signal circuit path 226sig' and 226sig" respectively.

In the wiring design of FIG. 3C, the signal wire 222sig of the power cable 204, which is connected to the signal circuit path 226sig, can be used to select strobe patterns in the lights connected with the light cable 210. The signal wire 304p1 of the signal cable 302, which is connected to signal circuit path 226sig', can be used to select strobe patterns in the lights connected with the light cable 208. The signal wire 304p2 of the signal cable 302, which is connected to signal circuit path 226sig", can be used to select strobe patterns in the lights connected with the light cable 206.

Figures 4A, 4B:
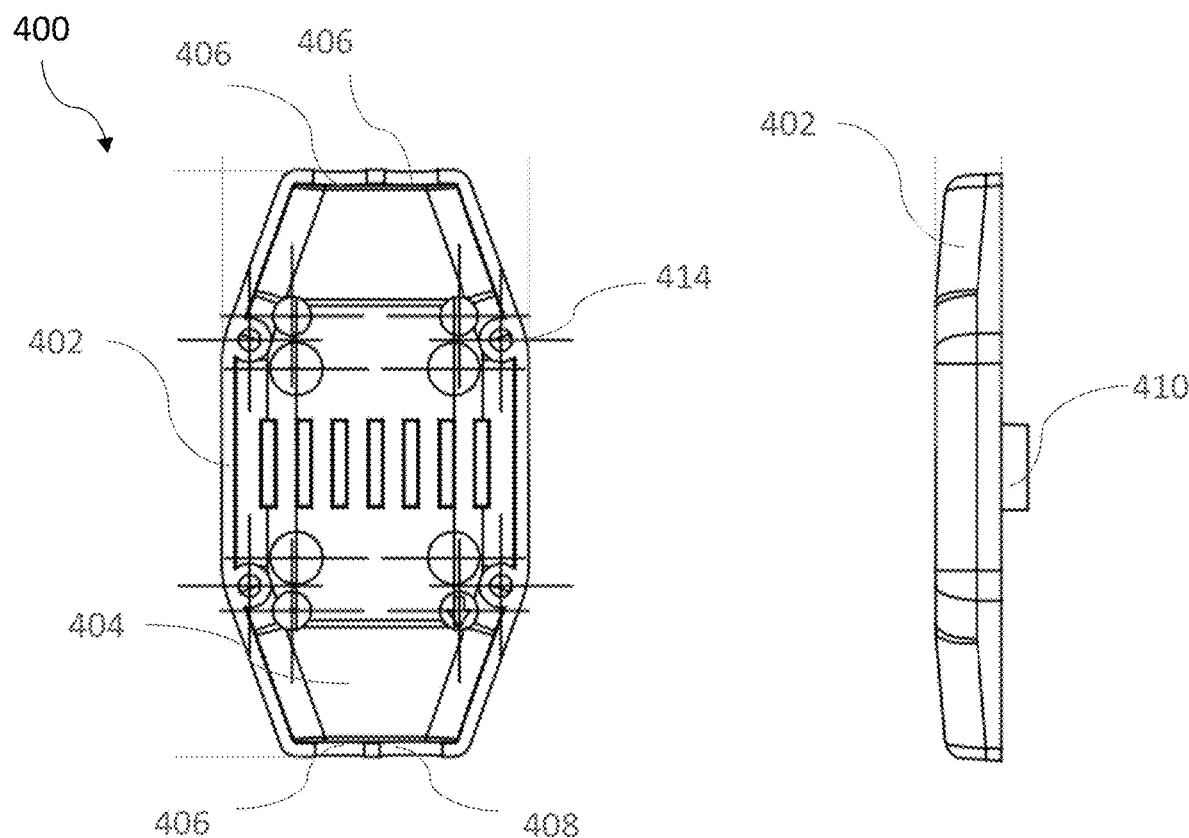
FIGS. 4A-4E schematically illustrate a junction box for a wiring hub according to embodiments of the present disclosure.
Figure 4C:
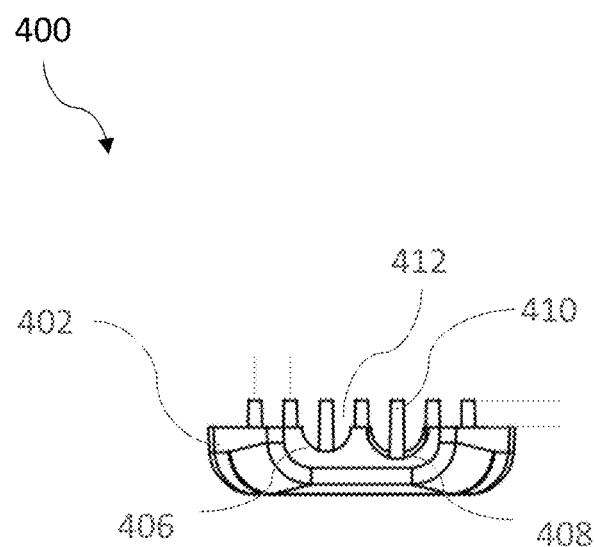

FIGS. 4A-4E schematically illustrate a junction box 400 for wiring hubs according to embodiments of the present disclosure. The junction box 400 may be used in place of the junction box 202 described above. In some embodiments, the junction box 400 includes two half shell 402 secured together. FIG. 4A is a schematic top view of the half shell 402 according to one embodiment. FIGS. 4B and 4C are schematic side views of the half shell 402 of FIG. 4A.

As shown in FIGS. 4A-4C, the half shell 402 may form a basin defining an inner volume 404 to retain wires and sealing materials therein. In FIG. 4A, the half shell 402 has a hexagonal shape. However, the half shell 402 may be formed in any suitable shape, such as rectangular, oval, circular, triangular, tear drop, or the like, according to functional and decorative designs. Cable openings 406, 408 may be formed through the half shell 402 to allow cables, such as the power cable 204 and the light cables 206, 208, 210. The cable openings 406, 408 may be arranged along perimeter of the half shell 402. In some embodiments, the cable openings 406, 408 may be arranged along two opposing sides of the half shell 402 to accommodate wire arrangements. In some embodiments, the cable openings 406, 408 are sized to be close to half of the cross sectional area of the cable to be retained therein. In some embodiments, the cable opening 408 may be larger than the cable openings 406. The larger cable opening 408 may be sized to retain a larger cable, such as the power cable 204.

In some embodiments, the half shell 402 includes alignment features 414 configured to assemble two half shells 402 together into the junction box 400. The alignment features 414 may be any suitable structures operable to hold align and/or hold two half shells 402 together. In some embodiments, the alignment features 414 may be pin and hole structures, hook and clip structures, or the like. In other embodiments, the alignment features 414 may be screw holes allowing two half shells 402 to be secured together by screws.

In some embodiments, a plurality of dividers 410 may be formed within the inner volume 404. The dividers 410 may extend from a bottom of the half shell 402. The dividers 410 may be a plurality of wall segments arranged in parallel forming a plurality of slots 412 between the neighboring dividers 410. In some embodiment, the dividers 410 may extend above sidewalls of the half shell 402, as shown in FIGS. 4B-4C, to facilitate easy assembly. The slots 412 may be sized to securely hold two or more connected wires therein.

Figure 4D:
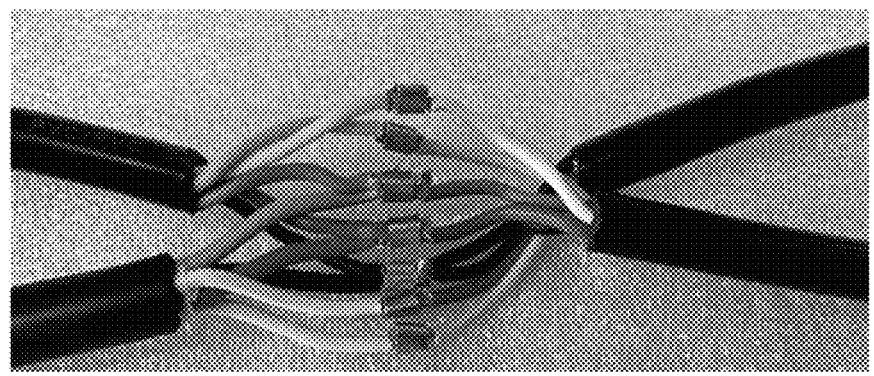
Figure 4E:
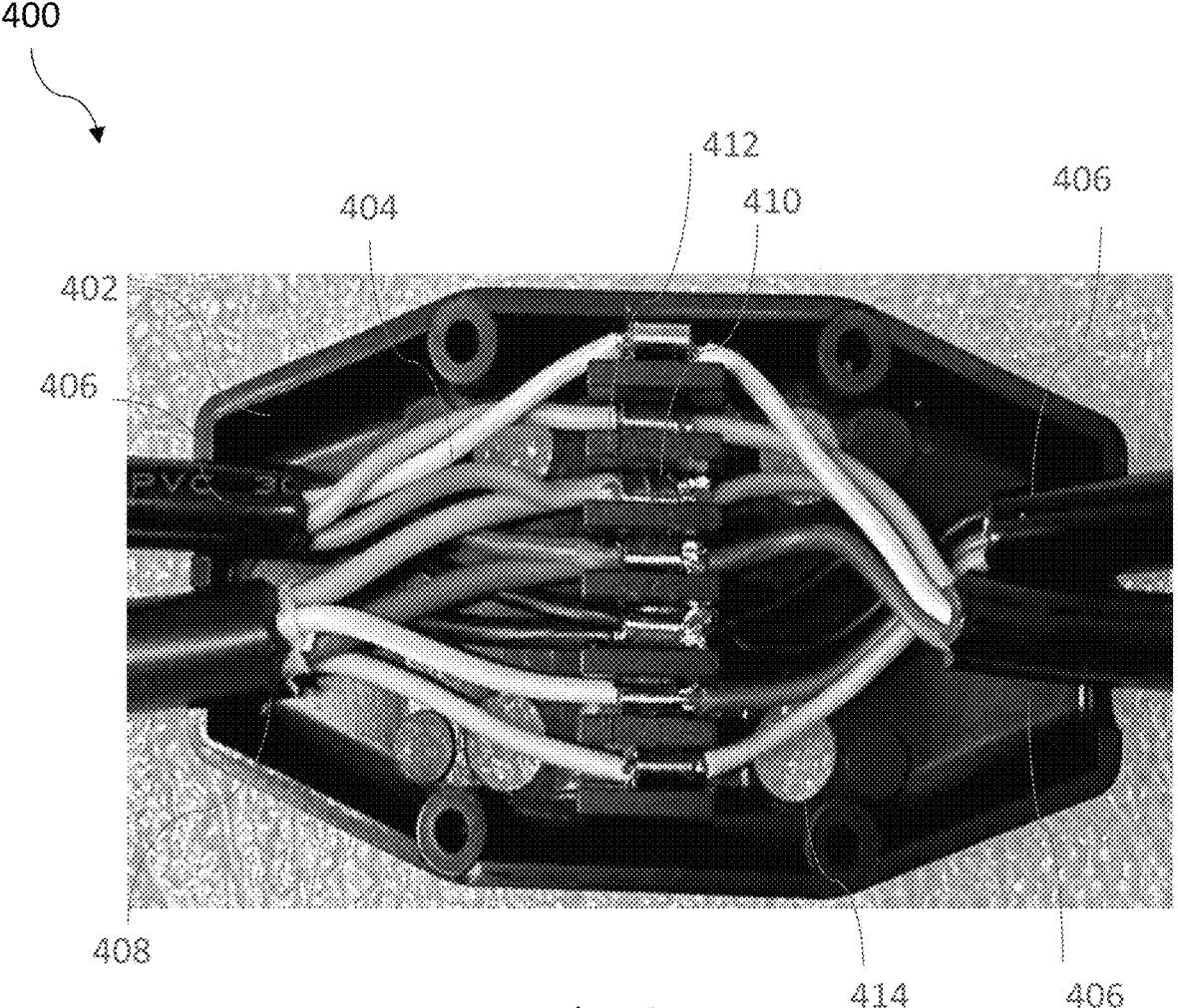

During fabrication, outer sheaths of the power cable 204 and the light cables 206, 208, 210 may be first removed from the proximal ends 204p, 206p, 208p, 210p respectively to expose the individual wires. The individual wires are then connected according to the wire design. FIG. 4D schematically illustrates a processing stage in which wires of the power cable 204 and the light cables 206, 208, 210 are connected according to wiring design. The power cable 204 and the light cables 206, 208, 210 are secured to the half shell 402, as shown in FIG. 4E. A second half shell 402 is then installed to close the inner volume 404. In some embodiments, a sealing material, such as an epoxy resin, may be injected into the inner volume 404. When the sealing material is cured in the inner volume 404, the wire connections are further secured with isolation material disposed between non-connected wires for further isolation.

Figure 5A:
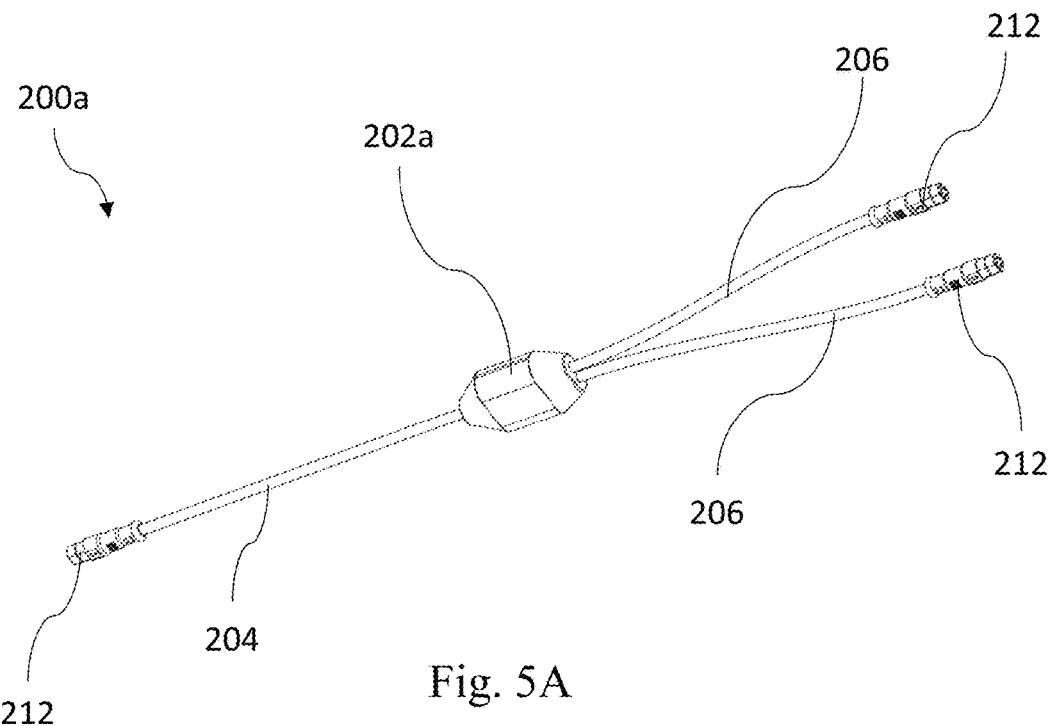
FIGS. 5A-5E schematically illustrate various harness assemblies according to the present disclosure.
Figure 5B:
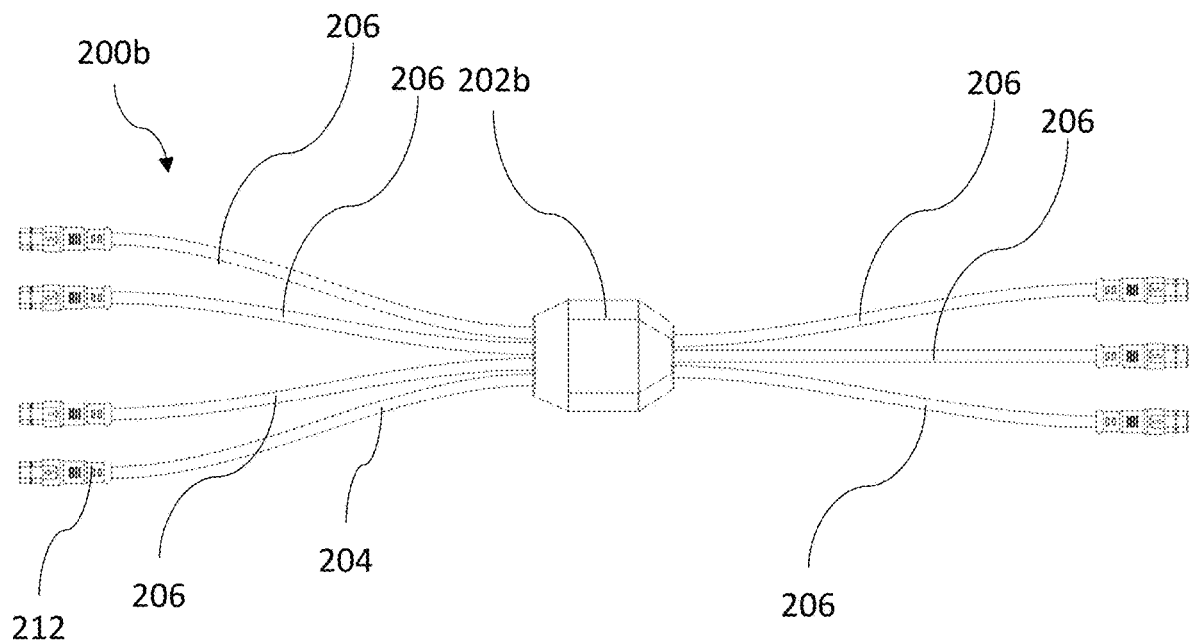
Figure 5C:
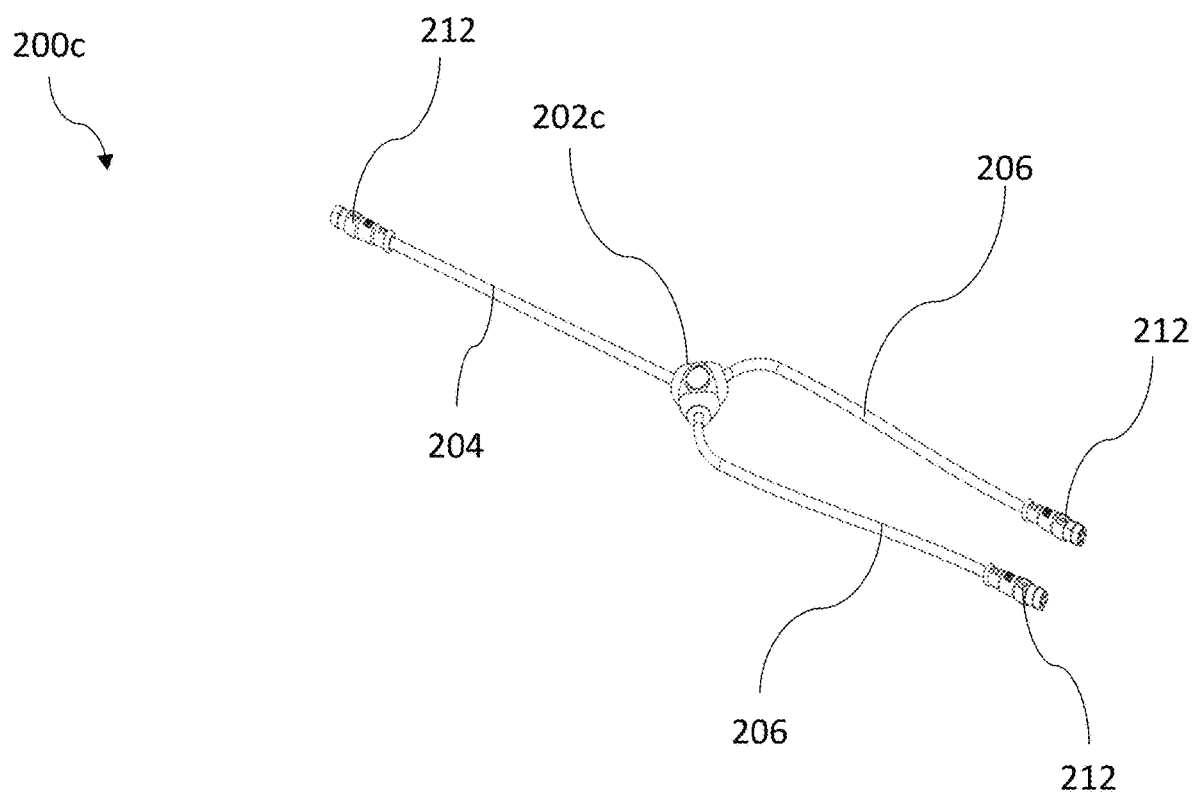

FIGS. 5A-5C schematically illustrate various wiring hubs 200a-200c according to the present disclosure. FIG. 5A schematically illustrates a wiring hub 200a according to embodiments of the present disclosure. The wiring hub 200a may be used in place of the wiring hub 116 in the vehicle light assembly 100 of FIG. 1. Depending on the wiring design, the wiring hub 200a may be used alone with vehicle lights. The wiring hub 200a is similar to the wiring hub 200 shown in FIG. 2A except that the wiring hub 200a only includes two light cables 206 extending from a junction box 202a. Similar to the wiring hub 200, the wiring hub 200a may be designed to achieve different drive and control goals by selecting different wiring design in the junction box 202*a*.

FIG. 5B schematically illustrates a wiring hub 200*b* according to embodiments of the present disclosure. The wiring hub 200*b* may be used in place of the wiring hub 116 in the vehicle light assembly 100 of FIG. 1. Depending on the wiring design, the wiring hub 200*b* may be used alone with vehicle lights. The wiring hub 200*b* is similar to the wiring hub 200 shown in FIG. 2A except that the wiring hub 200*b* includes six light cables 206 extending from a junction box 202*b*. Similar to the wiring hub 200, the wiring hub 200*b* may be designed to achieve different drive and control goals by selecting different wiring design in the junction box 202*b*.

FIG. 5C schematically illustrates a wiring hub 200*c* according to embodiments of the present disclosure. The wiring hub 200*c* is similar to the wiring hub 200*a* shown in FIG. 5A except that the wiring hub 200*c* includes a junction box 202*c* with a triangular shape.

Figure 5D:
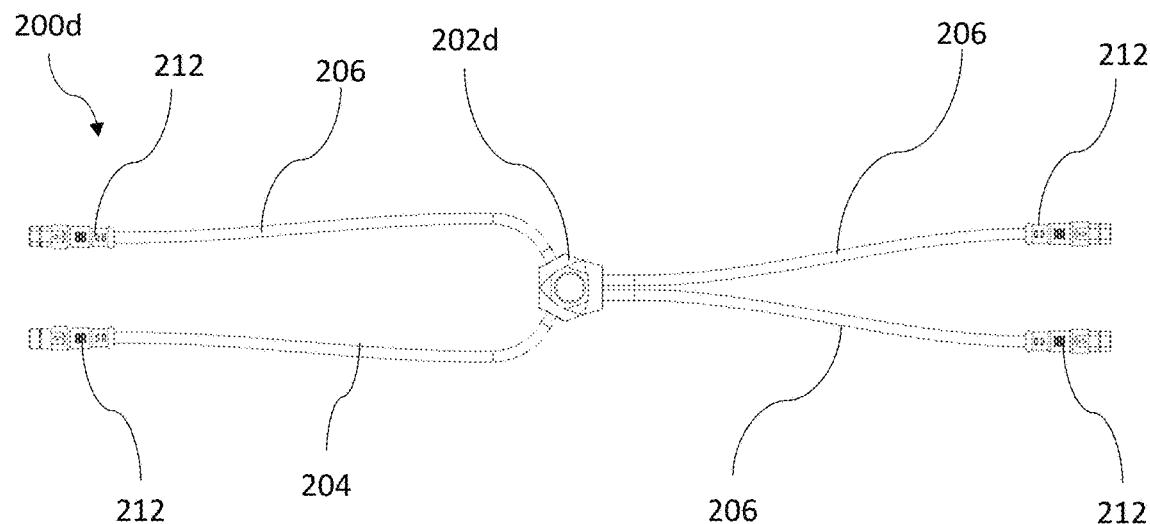

FIG. 5D schematically illustrates a wiring hub 200*d* according to embodiments of the present disclosure. The wiring hub 200*d* is similar to the wiring hub 200*c* shown in FIG. 5C except that the wiring hub 200*d* includes a junction box 202*d* having three light cables 206 extending therefrom.

Figure 5E:
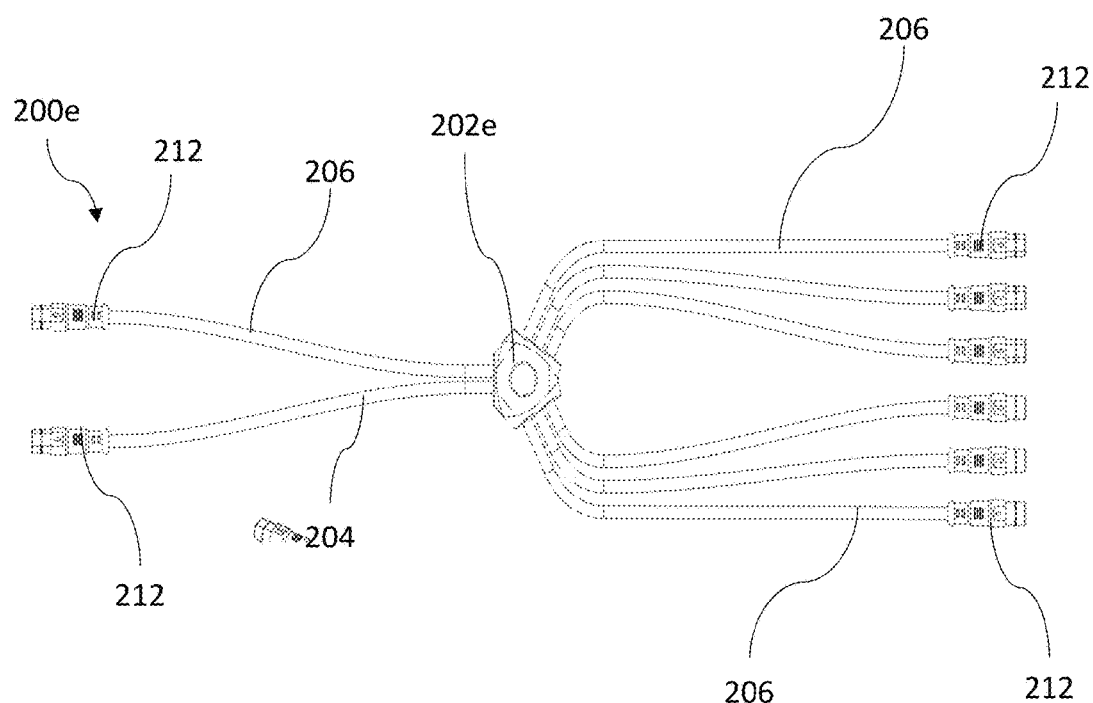

FIG. 5E schematically illustrates a wiring hub 200*e* according to embodiments of the present disclosure. The wiring hub 200*e* is similar to the wiring hub 200*c* shown in FIG. 5C except that the wiring hub 200*e* includes a junction box 202*e* having seven light cables 206 extending therefrom.

Figure 6A:
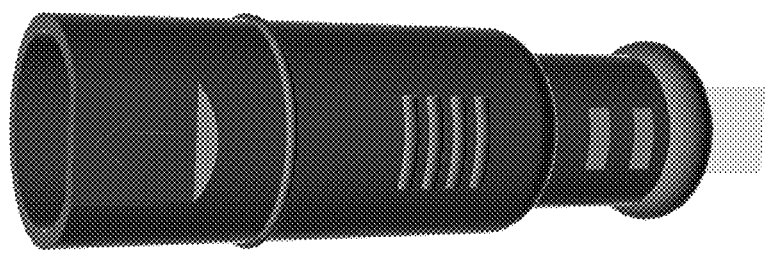
FIGS. 6A-6D schematically illustrate modular connectors according to embodiments of the present disclosure.
Figure 6B:
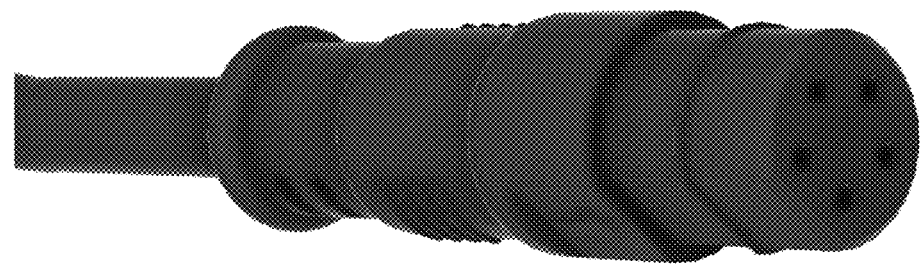
Figure 6C:
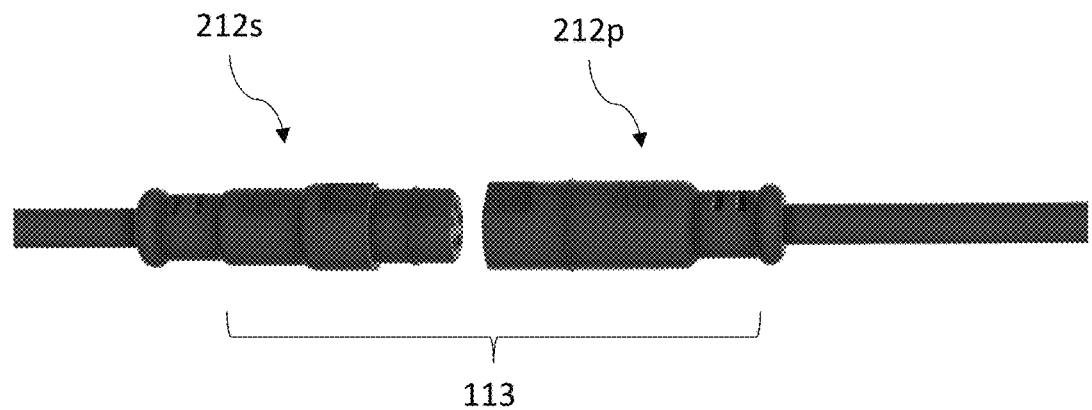

FIGS. 6A-6D schematically illustrate modular connectors according to embodiments of the present disclosure. FIG. 6A is a perspective view of a modular plug 212*p* according to one embodiment of the present disclosure. FIG. 6B is a perspective view of a modular socket 212*s* according to one embodiment of the present disclosure. FIG. 6C schematically demonstrate plug to connect action between the modular socket 212*s* and the modular plug 212*p*. The modular plug 212*p* and the modular socket 212*s* can be mated with each other by plugging the modular plug 212*p* into the modular socket 212*s*, forming the modular joint 113, as shown in FIG. 6C.

Figure 6D:
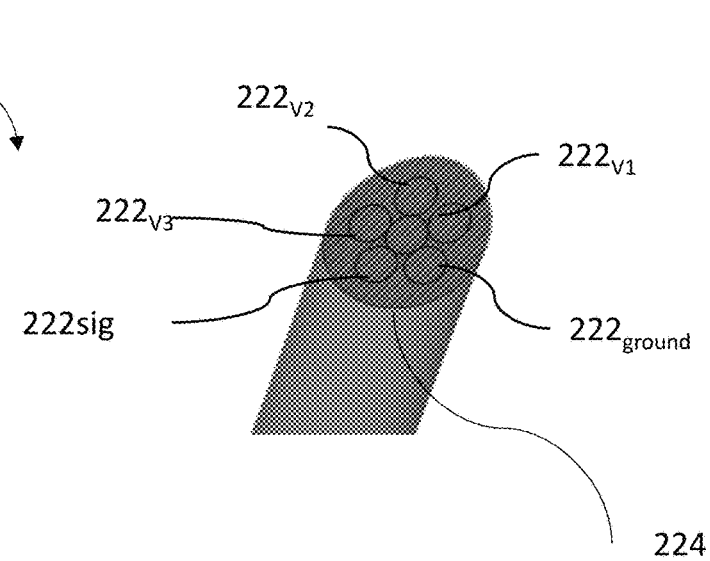

FIG. 6D is a perspective cross section view of a cable design used with vehicle light kits according to embodiments of the present disclosure. The cable may be used for the power cable 204, the light cable 206, 208, 210, the signal cable 302, described above. Particularly, the cable may be pre-manufactured five core cable with file wires, such as wires 222*patter*, 222*ground*, 222*v*1, 222*v*2, 222*v*3, sealed in an outer sheath 224.

It should be noted that light harness assemblies according to the present disclosure may use any cable selections suitable for driving and controlling vehicle lights, such as strobe lights.

FIGS. 7A-7D schematically illustrate a cable retainer 500 according to the present disclosure. The cable retainer 500 is configured to disposed over a plug-and-play cable joint, such as the cable joint 113, to prevent the cable joint from accidently getting loose during operation of the vehicle.

Figure 7A:
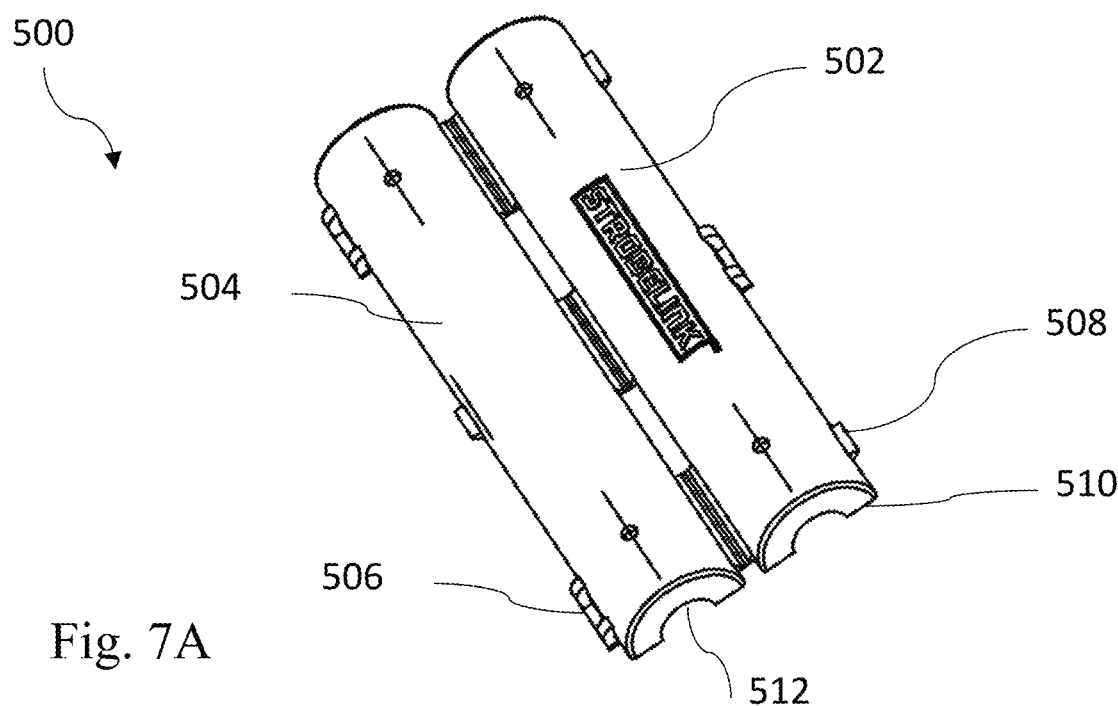
FIGS. 7A-7D schematically illustrate a cable retainer according to the present disclosure.
Figures 7B, 7C:
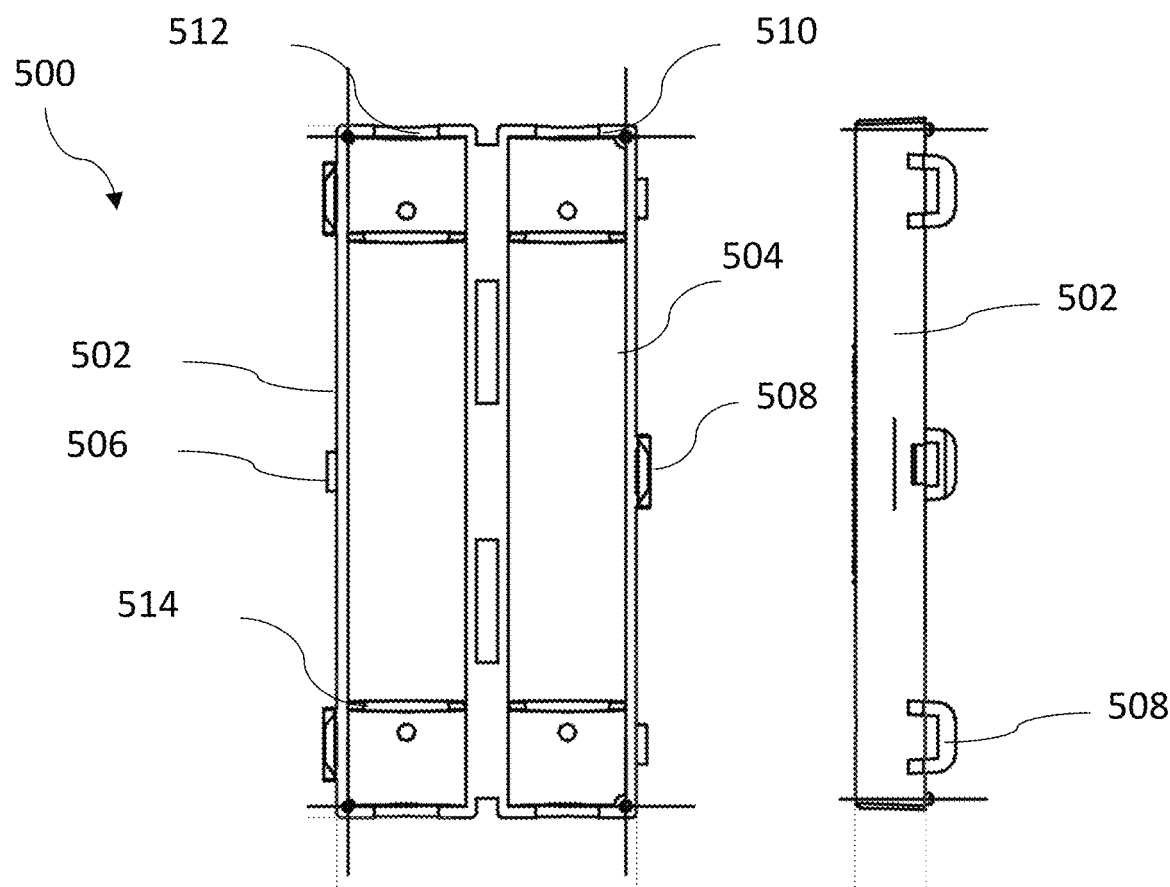
Figure 7D:
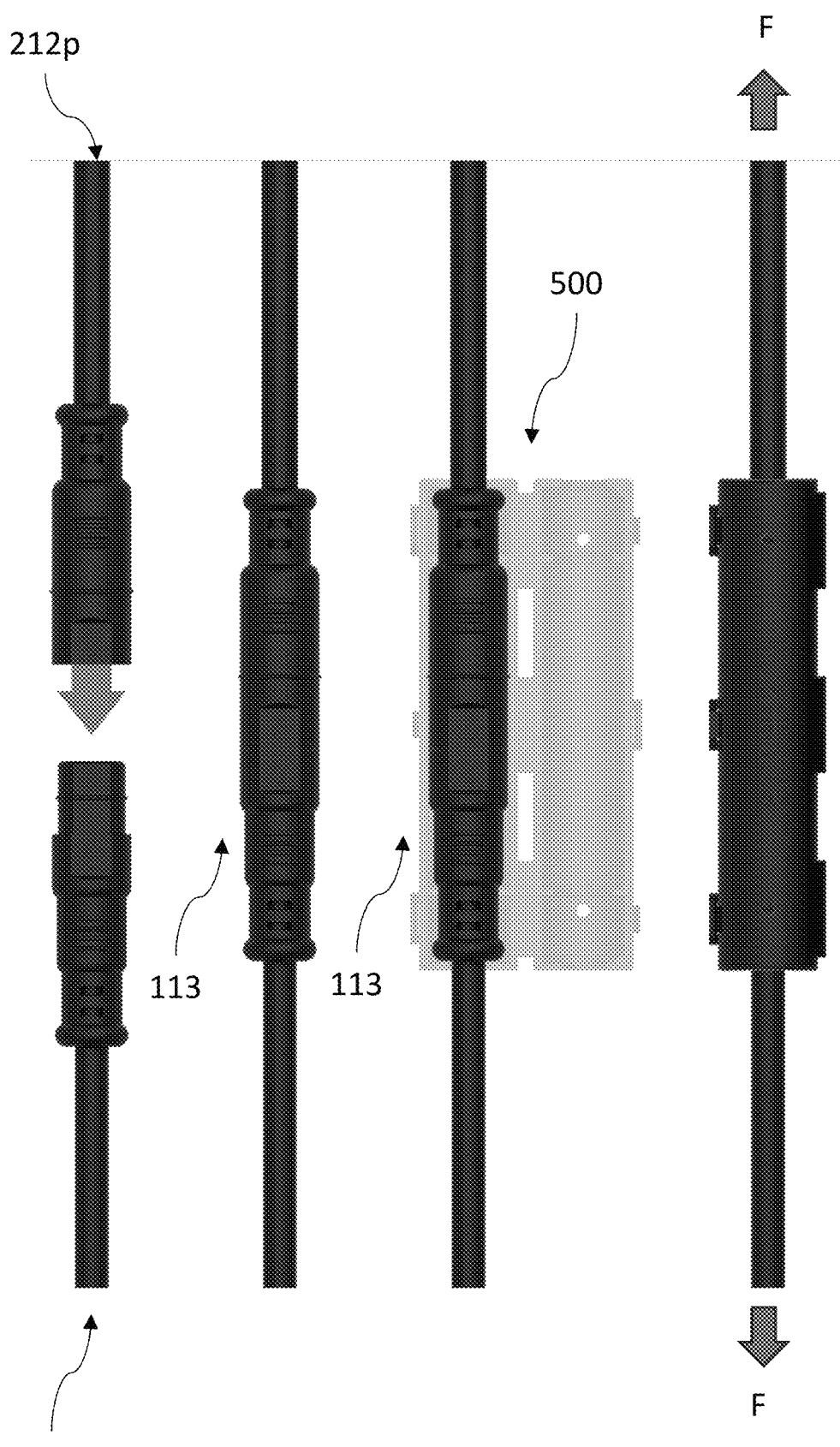

FIG. 7A is a perspective exterior view of the cable retainer 500 at an open position. FIG. 7B is a plan interior view of the cable retainer 500 at an opening position. FIG. 7C is a side view of the cable retainer 500. FIG. 7D include a sequence of applying a cable retainer 500 around a cable joint.

The cable retainer 500 may include two half tubular bodies 502, 504 movably connected. The cable retainer 500 may include closure features 506, 508 formed on the half tubular bodies 502, 504. The closure features 506, 508 may latch with each other to lock the cable retainer 500 in a closed position. In some embodiments, the closure features 506, 508 are hook and loop. However, the closure features 506, 508 may be any suitable structures. The tubular half bodies 502, 504 further include end wall sections 510. Cable openings 512 are formed through the end wall sections 510. The cable openings 512 are sized to allow passage of the cable body and prevent passage of the cable joint 113, therefore preventing the cable retainer 500 from axial movement when closed over a cable joint. In some embodiments, the cable retainer 500 further includes interior retaining walls 514 configured to prevent the cable joint form moving within the cable retainer 500. As shown in FIG. 7D, the cable retainer 500 may be applied over the cable joint 113, enabling the cable joint 113 to sustain external pulling force.

Figure 8:
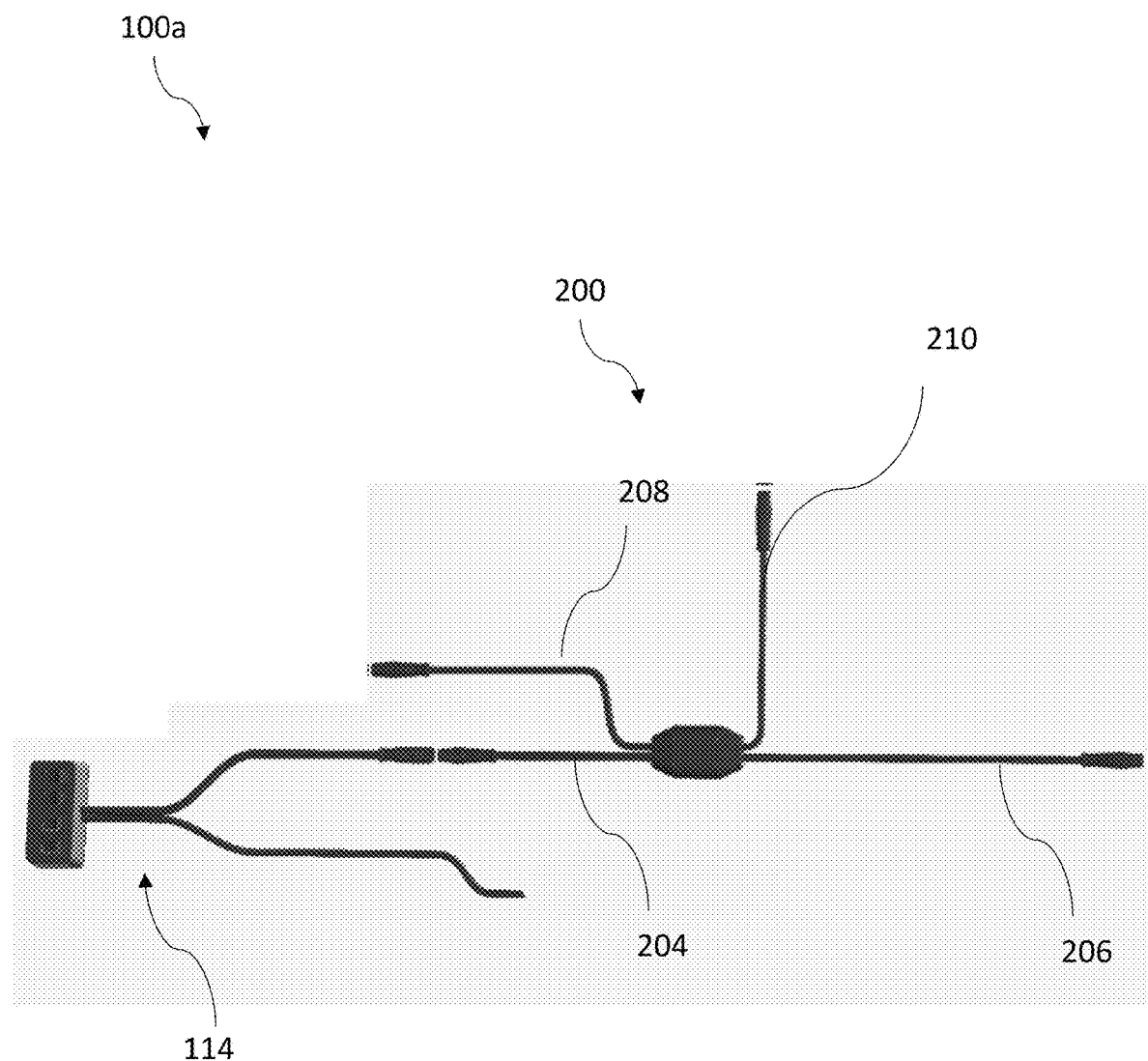
FIG. 8 schematically illustrates a harness kit with a controller according to embodiments of the present disclosure.

FIG. 8 schematically illustrates a harness kit 100*a* according to embodiments of the present disclosure. The harness kit 100*a* includes the wiring hub 200 and a controller 114 connected to the power cable 204 of the wiring hub 200. As previously discussed, the wiring hub 200 may be used alone to drive and control vehicle lights. The controller 114 may be disposed between the vehicle power supply and the power cable 204 to facilitate turning on and off the strobe lights, and optionally to facilitate strobe pattern selection, color selection, synchronization, or the likes.

Figure 9A:
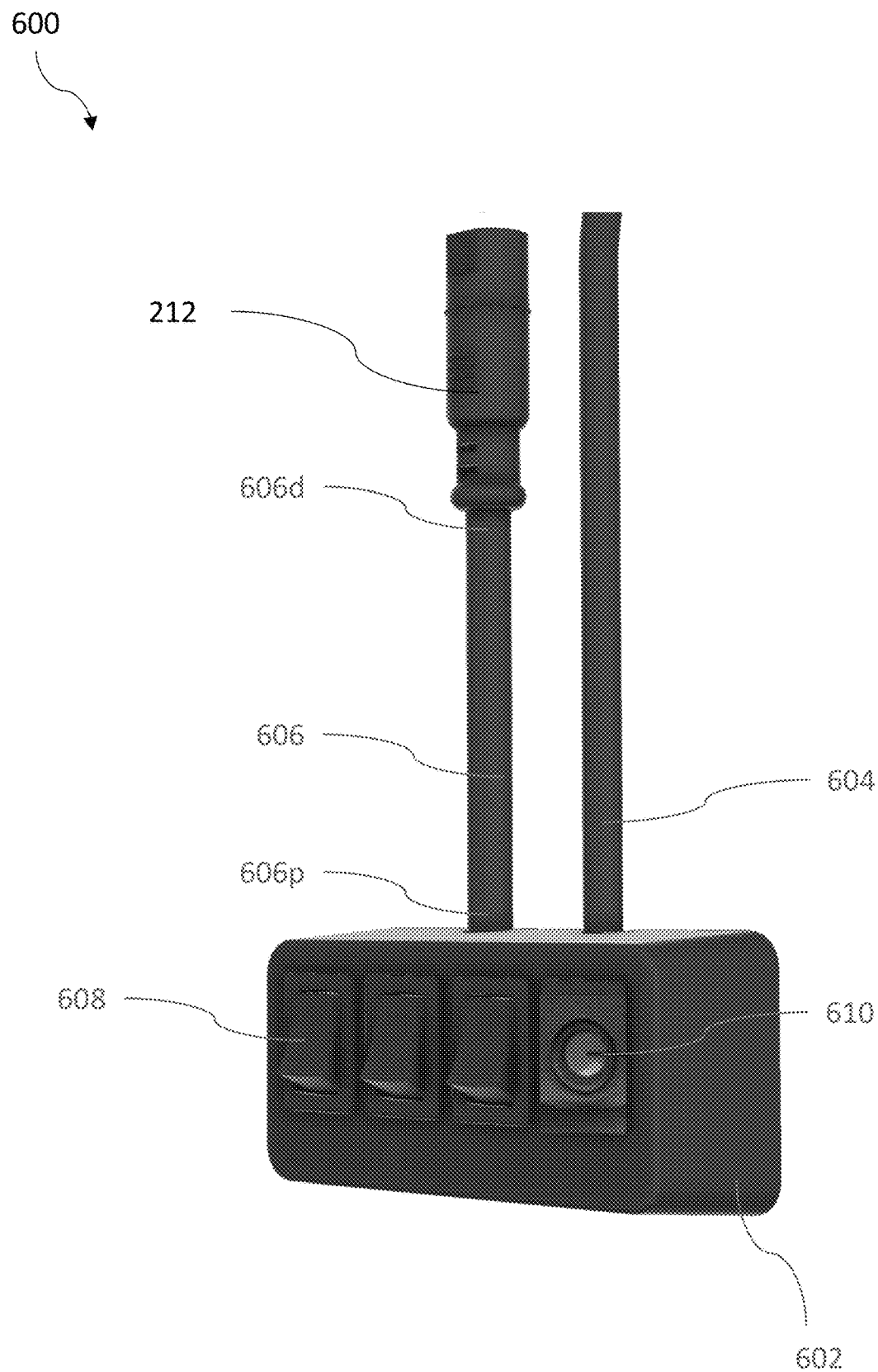
FIGS. 9A-9C schematically illustrate a controller according to embodiments of the present disclosure.

FIG. 9A schematically illustrates a controller 600 according to embodiments of the present disclosure. The controller 600 may include a switch box 602. The controller 600 includes an input cable 604 and an output cable 606 extending from the switch box 602. The input cable 604 is configured to connect with a power supply, such as an on-board vehicle power supply. The output cable 606 is configured to connect with a power cable, such as the power cable 204 of the wiring hub 200. The switch box 602 includes one or more on and off switches 608 configured to selectively connect a power supply to function voltage wires. In some embodiments, the on and off switches 608 may be toggle switches. In some embodiments, the number of on and off switches are the same as the number of function voltage wires in the light cables. In some embodiments, the switch box 602 may include a signal switch 610 configured to selectively connect a power supply to a signal wire in the wire hub. The signal switch 610 may be used achieve various control functions, for example, pattern selection, color selection, and synchronization.

The output cable 606 may be selected to be the same cable as the power cable 204 of the wiring hub 200. For example, the output cable 606 and the power cable to be connected may include the same number of cores (or wires) and have the same current capacity. In some embodiments, a distal end of the output cable 606 has a modular connector 212 formed thereon so that the controller 600 may be connected to a wiring hub by plug-and-play.

The input cable 604 may include two wires configured to connect with the power supply and a ground. In some embodiments, the input cable 604 may be a pig tail with two wires. In other embodiments, the input cable 604 may be the same type of cable as the output cable 606, but only employing two wires leaving other wires floating. In some embodiments, a distal end of the output cable 608 has a modular connector 212 formed thereon so that the controller 600 may be connected to a wiring hub by plug-and-play.

The switch box 602 includes a suitable wiring arrangement configured to connect wires of the input cable 604 to wires of the output cable 606 through the switches 608 and

Figure 9B:
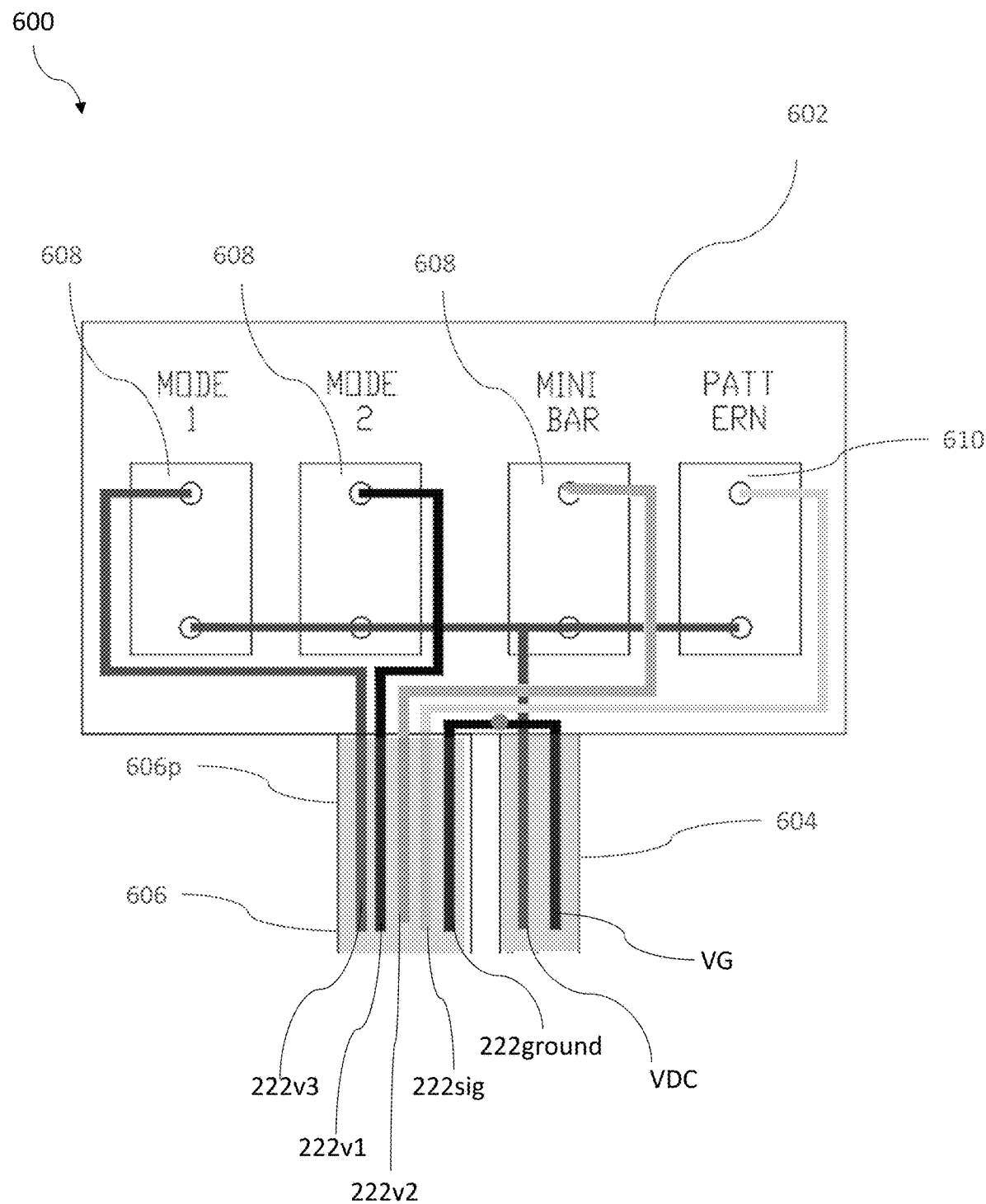
Figure 9C:
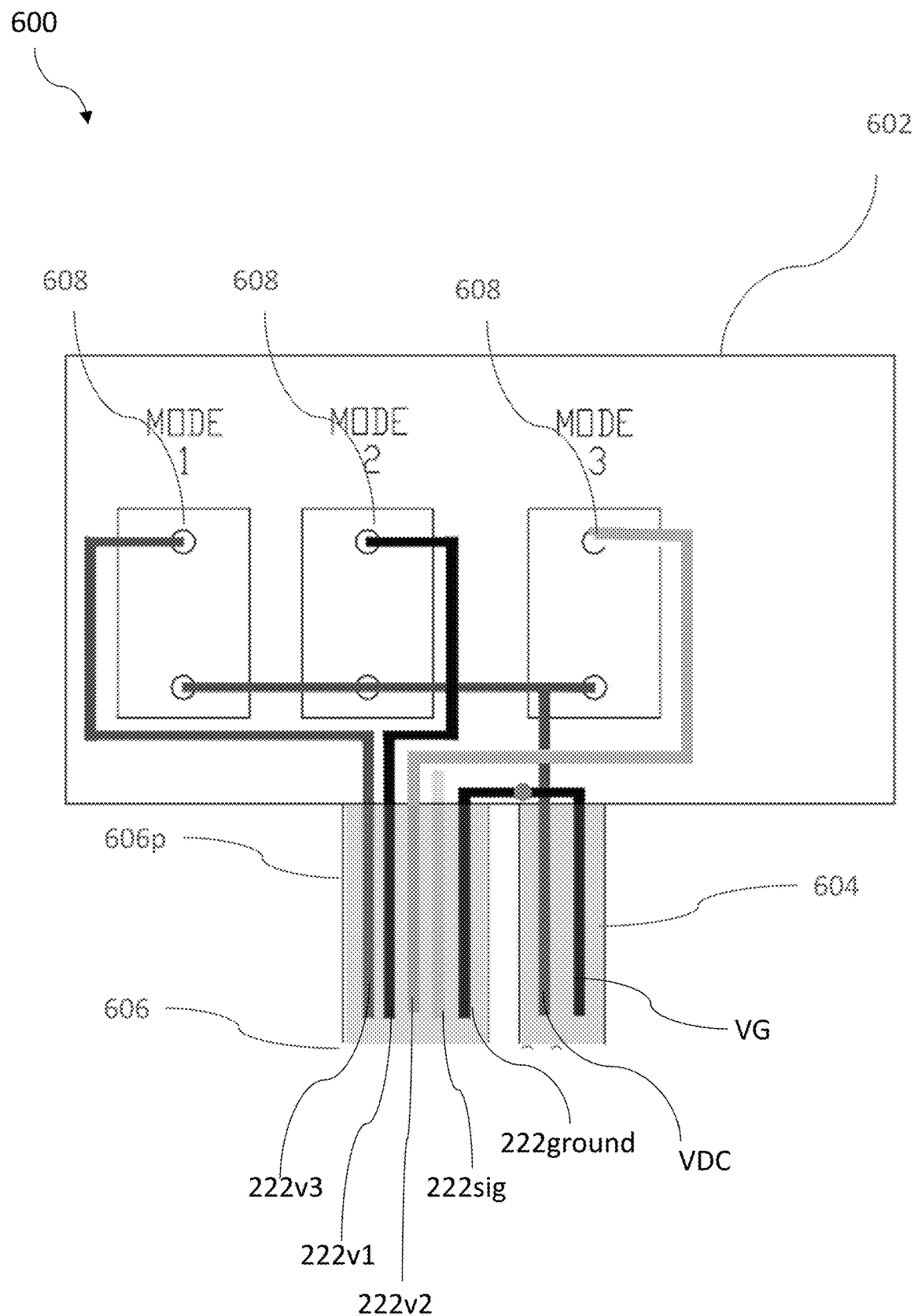

610. Various wiring designs may be applied to achieve desirable function. FIGS. 9B and 9C provide two exemplary wiring designs for the controller 600.

FIG. 9B is a wiring circuit for the controller 600 according to one embodiment of the present disclosure. As discussed above, the wires of the output cable 606 may be assigned to the same functions as the power cable 204 in the wiring hub, such as the wiring hub 200. The output cable 606 includes the function voltage wires 222v1, 222v2, 222v3, 222sig, and 222ground. In the wiring circuit of FIG. 9B, the input cable 604 has a first wire VDC configured to connect with a positive direct current voltage, such as a vehicle voltage supply, and a second wire VG configured to connect to the ground of the vehicle. The second wire VG of the input cable 604 is connected to the ground wire 222ground of the output cable 606. The switch box 602 includes three on-and-off switches 608. The function voltage wires 222v1, 222v2, 222v3 of the output cable 606 are connected to the first wire VDC via the on-and-off switches 608 respectively. The signal wire 222sig of the output cable 606 is connected to the first wire VDC via the signal switches 610.

During operation, when an on-and-off switch 608 is turned on, the positive voltage from the power supply is supplied to the corresponding function voltage wire, thereof, turning on the down-stream lights, which would strobe in the pattern associated with the particular function voltage wire. Similarly, when the signal switch 610 is turned on, the positive voltage from the power supply is sent to the signal wires 222sig of the downstream lights, thereby, changing the strobe pattern of the lights.

FIG. 9C is a wiring circuit for the controller 600 according to another embodiments of the present disclosure. The wiring circuit of FIG. 9C is similar to the wiring circuit in FIG. 9B except that the signal wire 222sig of the output cable 606 is floating not connected. The switch box 602 also does not include a signal switch 610 or a signal switch is included but not connected. The wiring circuit of FIG. 9C may be used with a wire hub does not include pattern selecting function, such as the wiring hub 200 with the wiring circuit of FIG. 2C.

Figure 10:
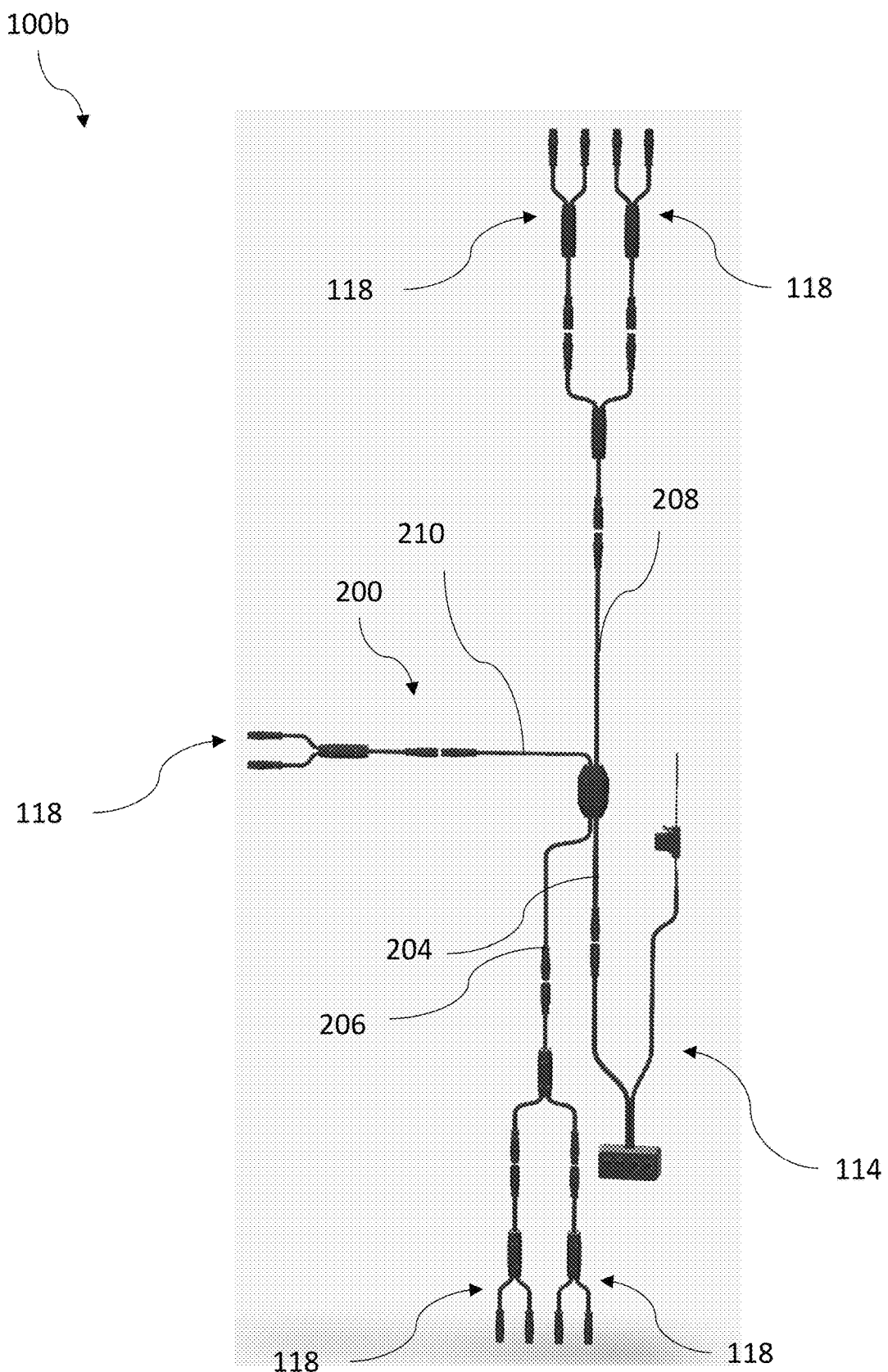
FIG. 10 schematically illustrates a harness kit with splitter cables according to embodiments of the present disclosure.

FIG. 10 schematically illustrates a harness kit 100b according to embodiments of the present disclosure. The harness kit 100b is similar to the harness kit 100a of FIG. 8 except that the harness kit 100b is expanded using multiple splitter cables 118 to drive additional vehicle lights.

Figure 11A:
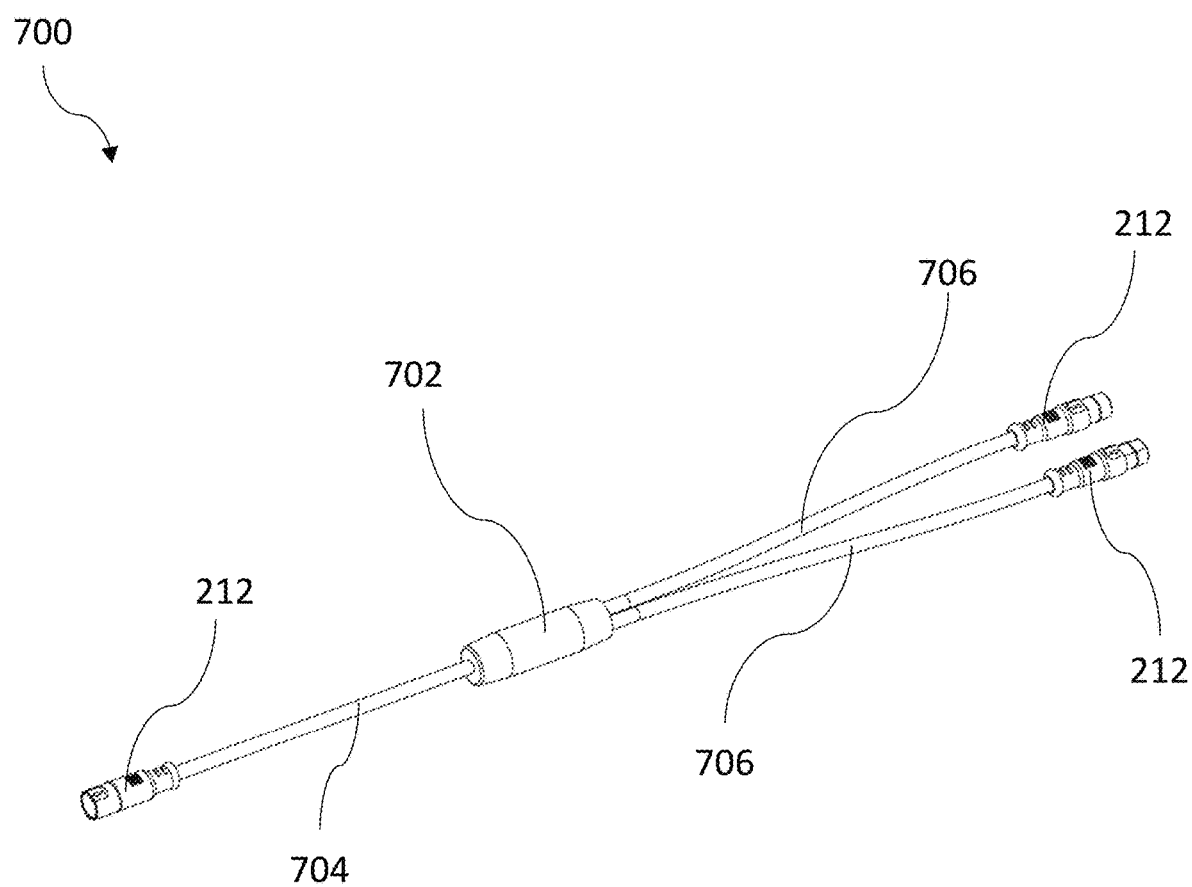
FIGS. 11A-11D schematically illustrate splitter cables according to the present disclosure.

FIGS. 11A-11D schematically illustrate splitter cables according to the present disclosure. FIG. 11A schematically illustrates a splitter cable 700 according to embodiments of the present disclosure. The splitter cable 700 may be used in place of the splitter cables 118 in the vehicle light assembly 100 and the harness kit 100b. The splitter cable 700 includes an input cable 704 and two output cables 706. Wire connections between the input cable 704 and the output cables 706 sealed in a junction box 702. Modular connectors 212 are formed on distal ends of the input cable 704 and the output cables 706 to facilitate plug-and-play expansion. The modular connectors 212 may be socket or plug to form a socket-plug joint, such as the cable joint 113.

Figure 11B:
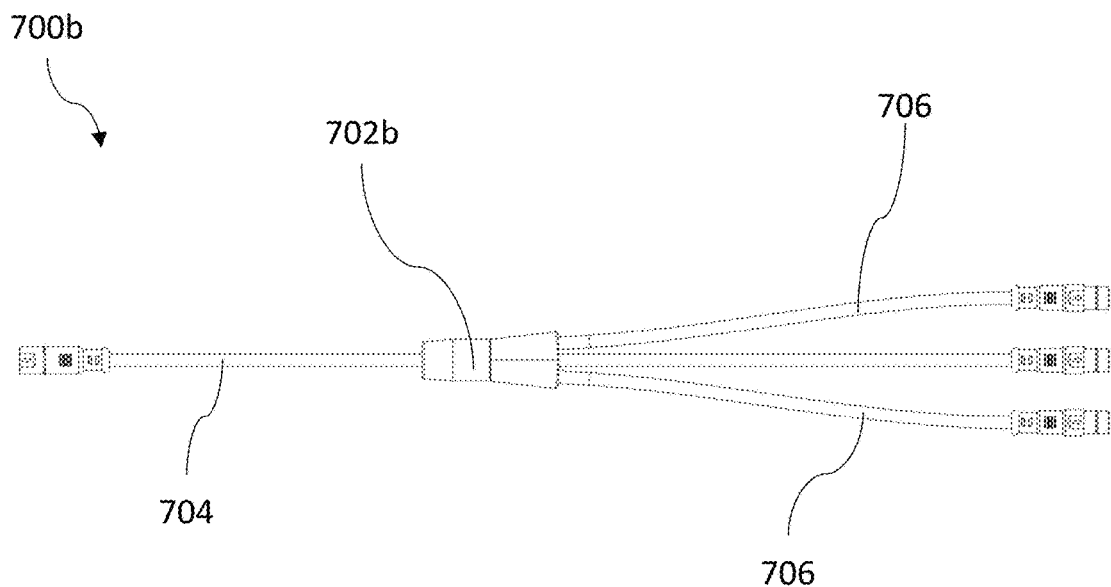

FIG. 11B schematically illustrates a splitter cable 700b according to embodiments of the present disclosure. The splitter cable 700b may be used in place of the splitter cables 118 in the vehicle light assembly 100 and the harness kit 100b. The splitter cable 700b is similar to the splitter cable 700 except that the splitter cable 700b includes three output cables 706.

Figure 11C:
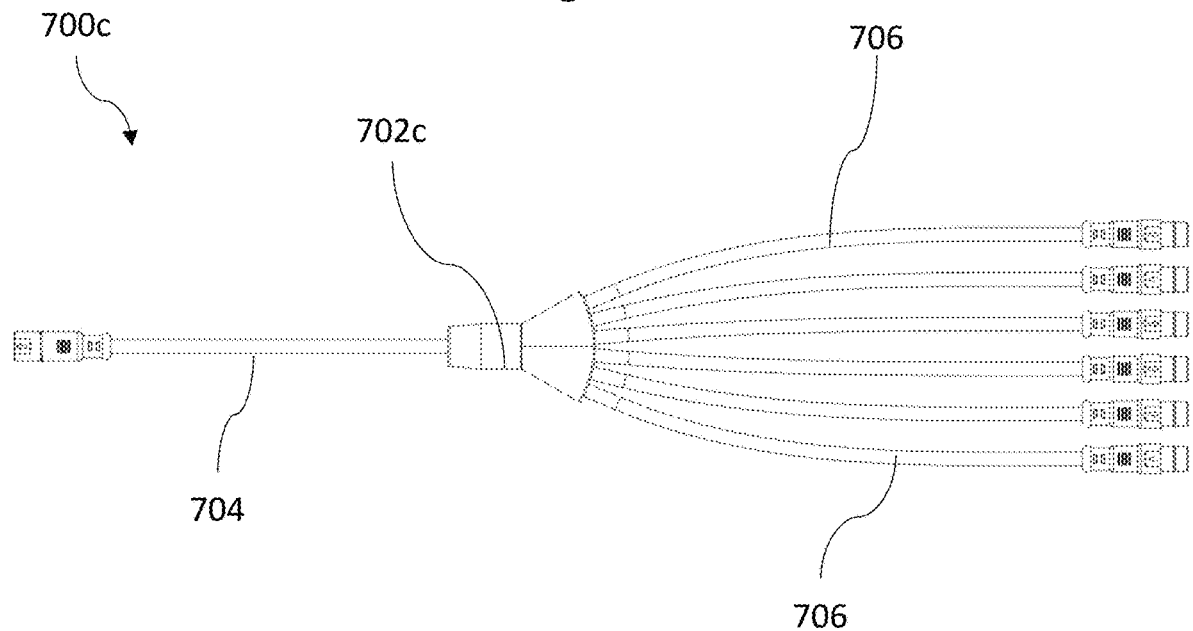

FIG. 11C schematically illustrates a splitter cable 700c according to embodiments of the present disclosure. The splitter cable 700c may be used in place of the splitter cables 118 in the vehicle light assembly 100 and the harness kit 100b. The splitter cable 700c is similar to the splitter cables 700 and 700b except that the splitter cable 700c includes six output cables 706.

Figure 11D:
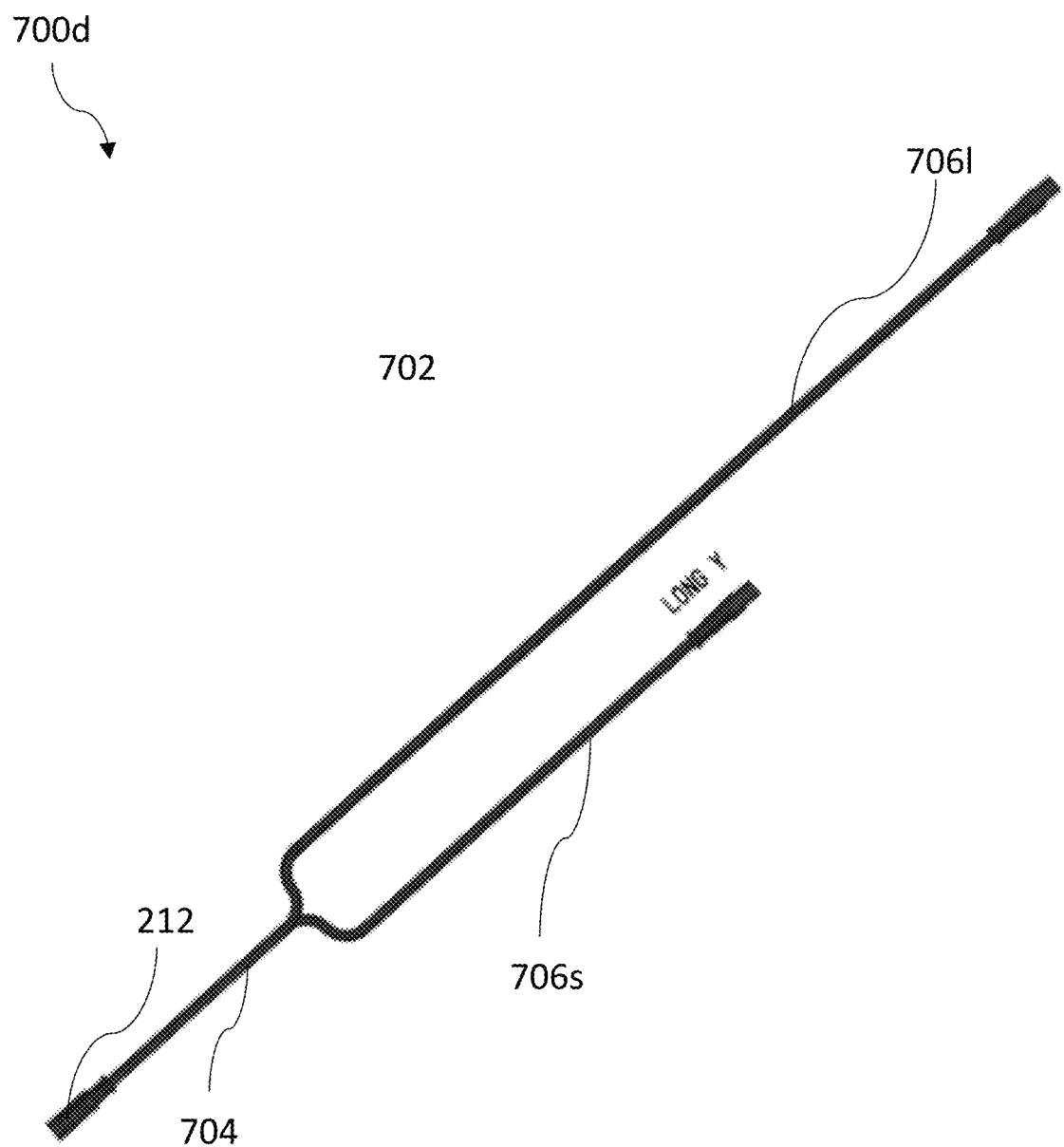

FIG. 11D schematically illustrates a splitter cable 700d according to embodiments of the present disclosure. The splitter cable 700d may be used in place of the splitter cables 118 in the vehicle light assembly 100 and the harness kit 100b. The splitter cable 700d is similar to the splitter cable 700 except that the splitter cable 700d includes two output cables 706s, 7061 of different lengths. The different lengths of the output cables 706s, 7061 is suitable for use in install lights on two sides of a vehicle when the wiring hub is positioned off centered.

Figure 12:
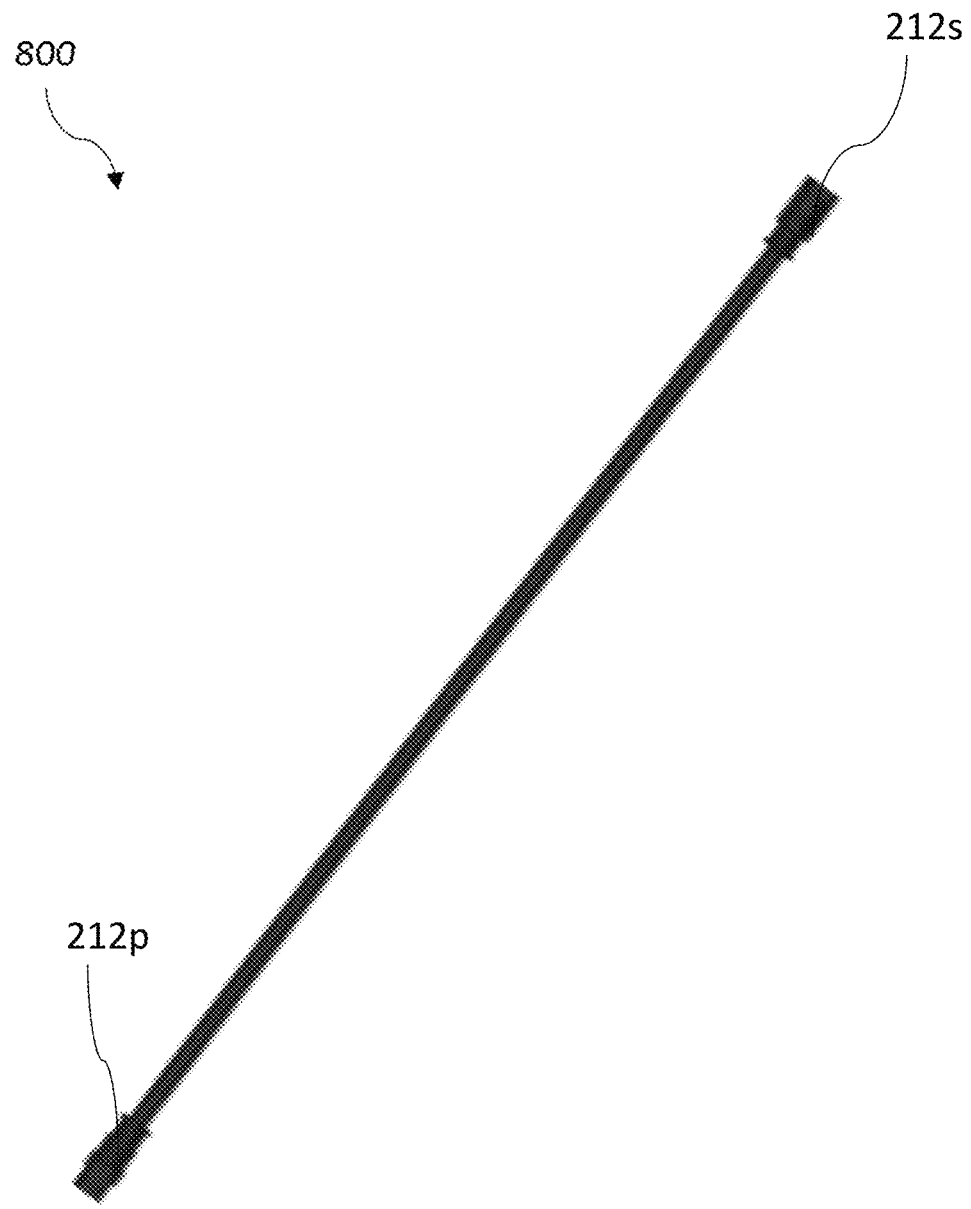
FIG. 12 schematically illustrates a modular extension cable according to embodiments of the present disclosure.

FIG. 12 schematically illustrates a modular extension cable 800 according to embodiments of the present disclosure. The modular extension cable 800 may include modular connectors on both ends to facilitate expansion in a plug-and-play manner.

Figure 13A:
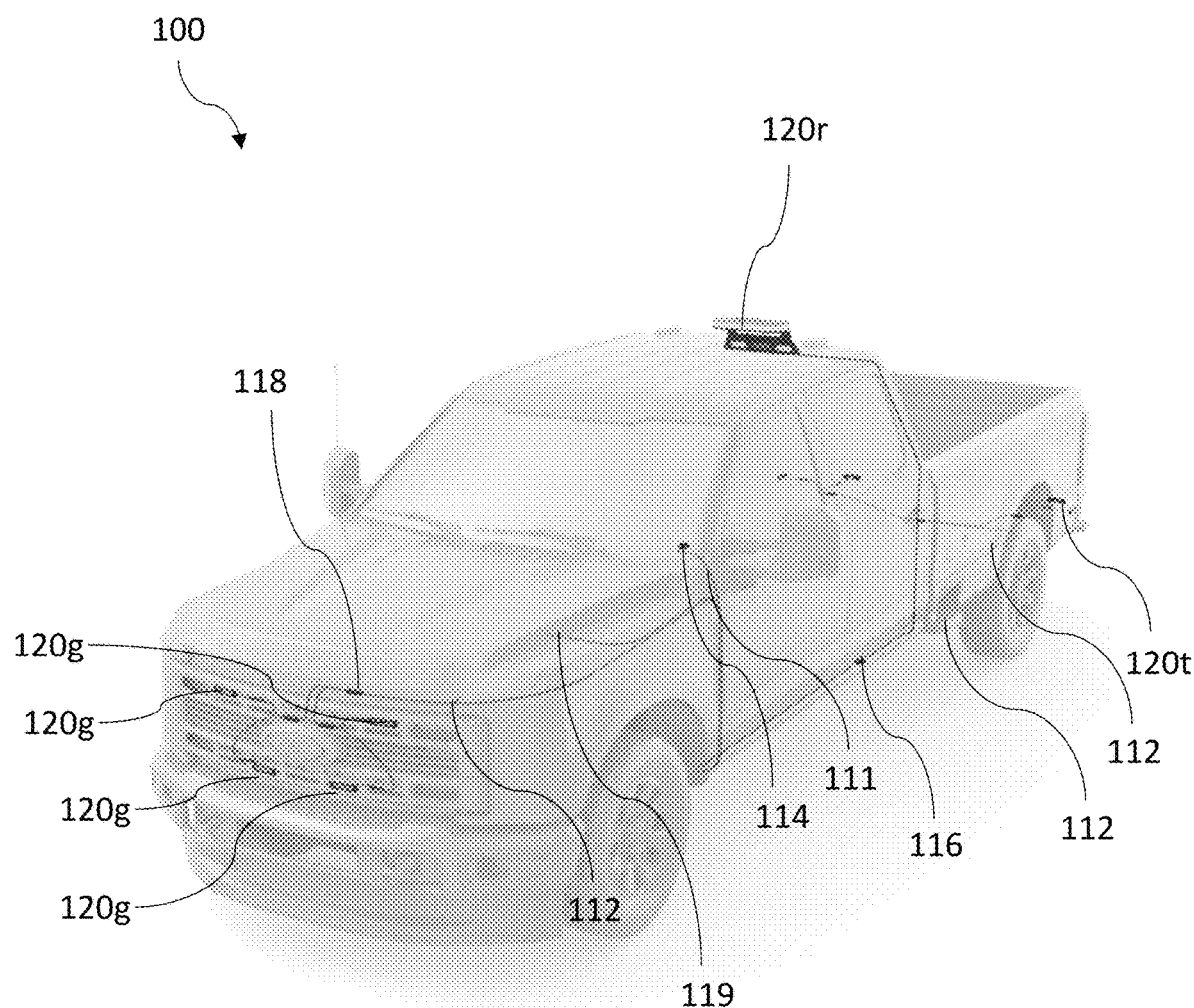
FIGS. 13A-13B schematically demonstrate a harness kit according to the present disclosure installed on a vehicle.
Figure 13B:
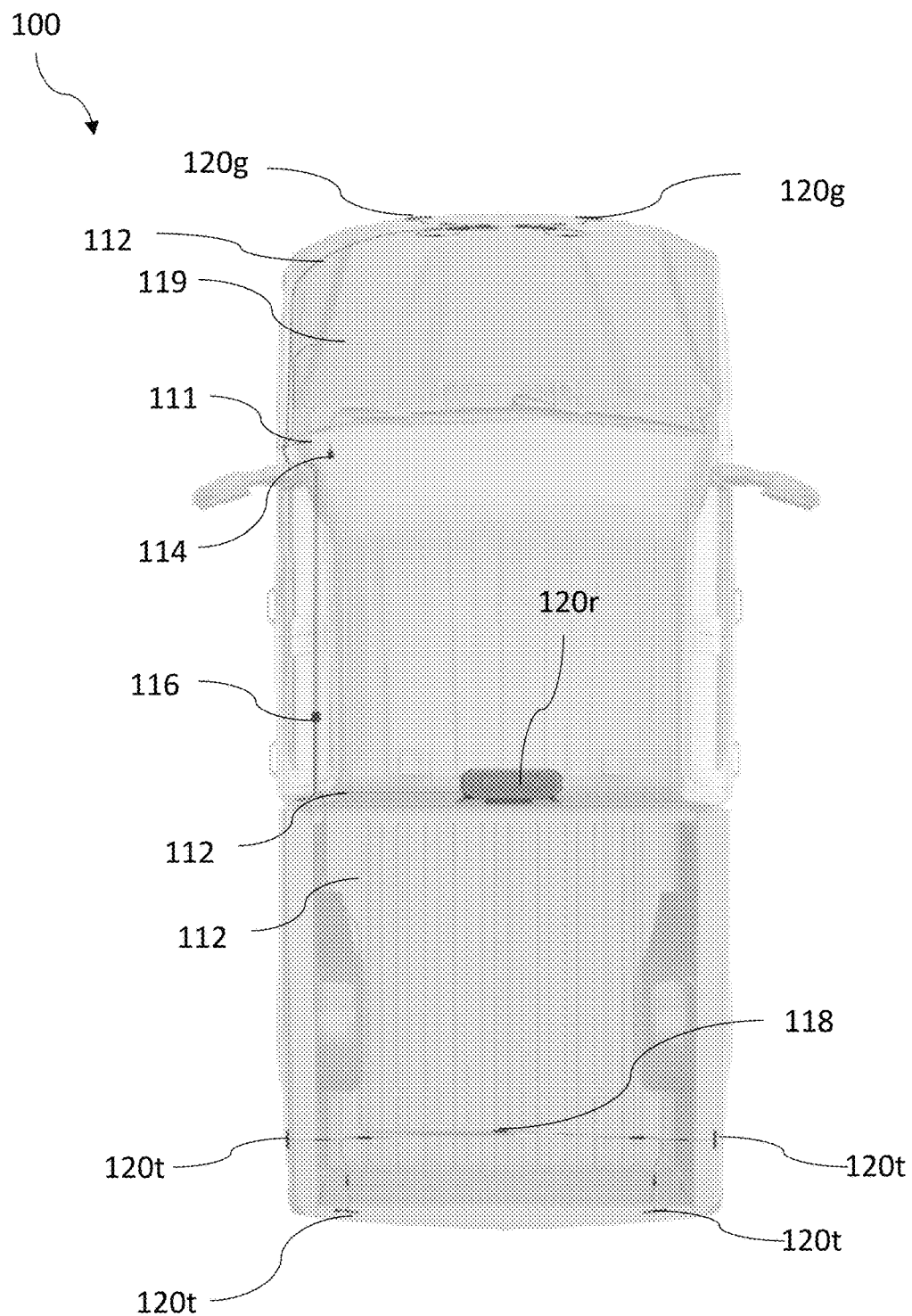

FIGS. 13A-13B schematically demonstrate the harness kit 100 according to the present disclosure installed on a vehicle. FIG. 13A is a schematic perspective view of a truck with emergency lights installed using a harness kit according to the present disclosure. FIG. 13B is a schematic top view of the truck. As shown in FIGS. 13A-13B, the wiring hub 116 may be installed under the truck body. The switch box 114 may be disposed in the cabin for easy access by the driver. The power cable 111 and the light cables 112 are arranged towards the grille, the roof, and the tail of the truck to connect with the grille lights 120g, the roof bar 120r, and the tail lights 120t. One or more splitter cables 118 may be used to allow multiple grille lights 120g and tail lights 120t on the truck.

FIGS. 14A-14F demonstrate various configurations of harness kits 900a-990f according to embodiments of the present disclosure. As demonstrated by FIGS. 14A-14F, harness kits according to the present disclosure are modular and may be expanded to meet different needs.

Figure 14A:
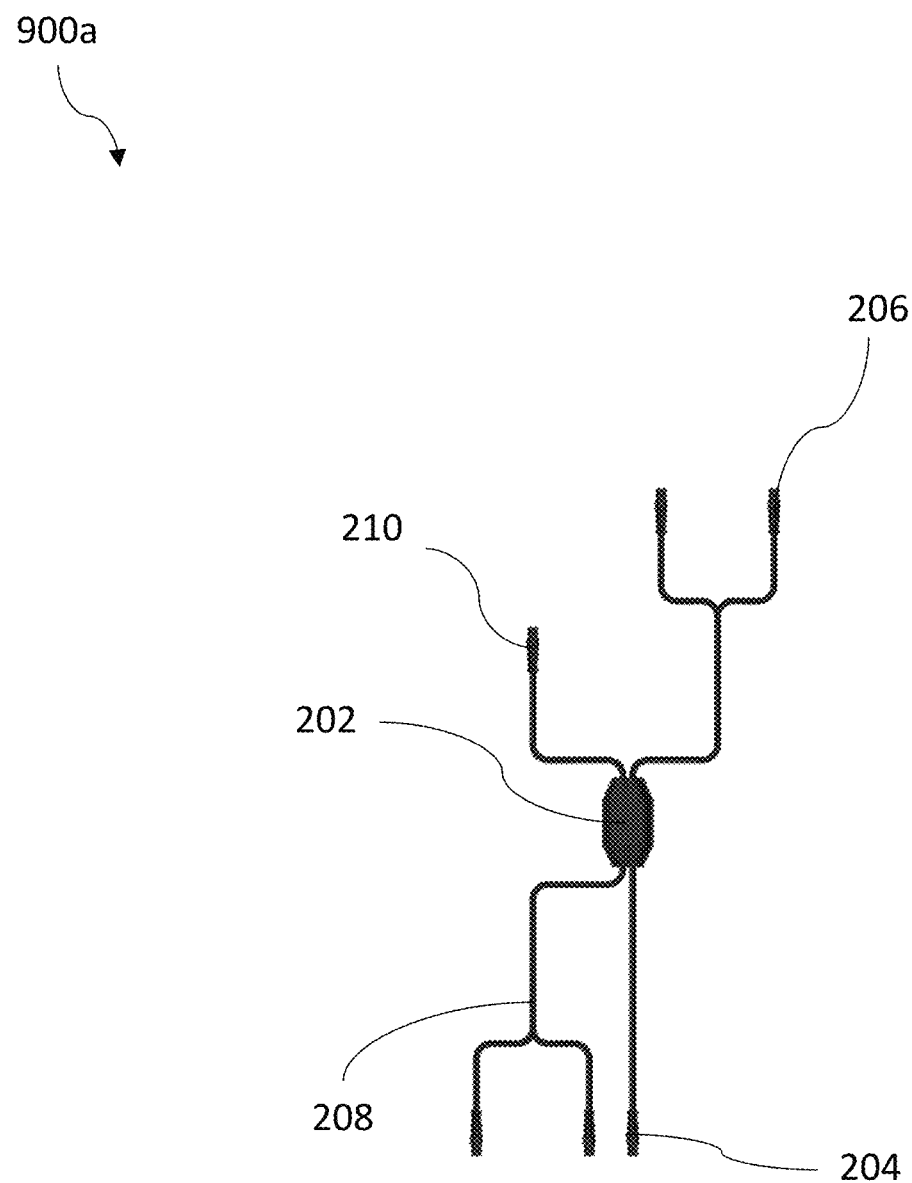
FIGS. 14A-14F demonstrate various configurations of harness kit according to embodiments of the present disclosure.

FIG. 14A shows a harness kit 900a which includes only a wiring hub. The harness kit 900a includes the connection box 202 having a power cable 204, one light cable 210 for connecting a roof light bar, a light cable 208 for connecting two lights at the grille, and a light cable 206 for connecting two lights at the tail.

Figure 14B:
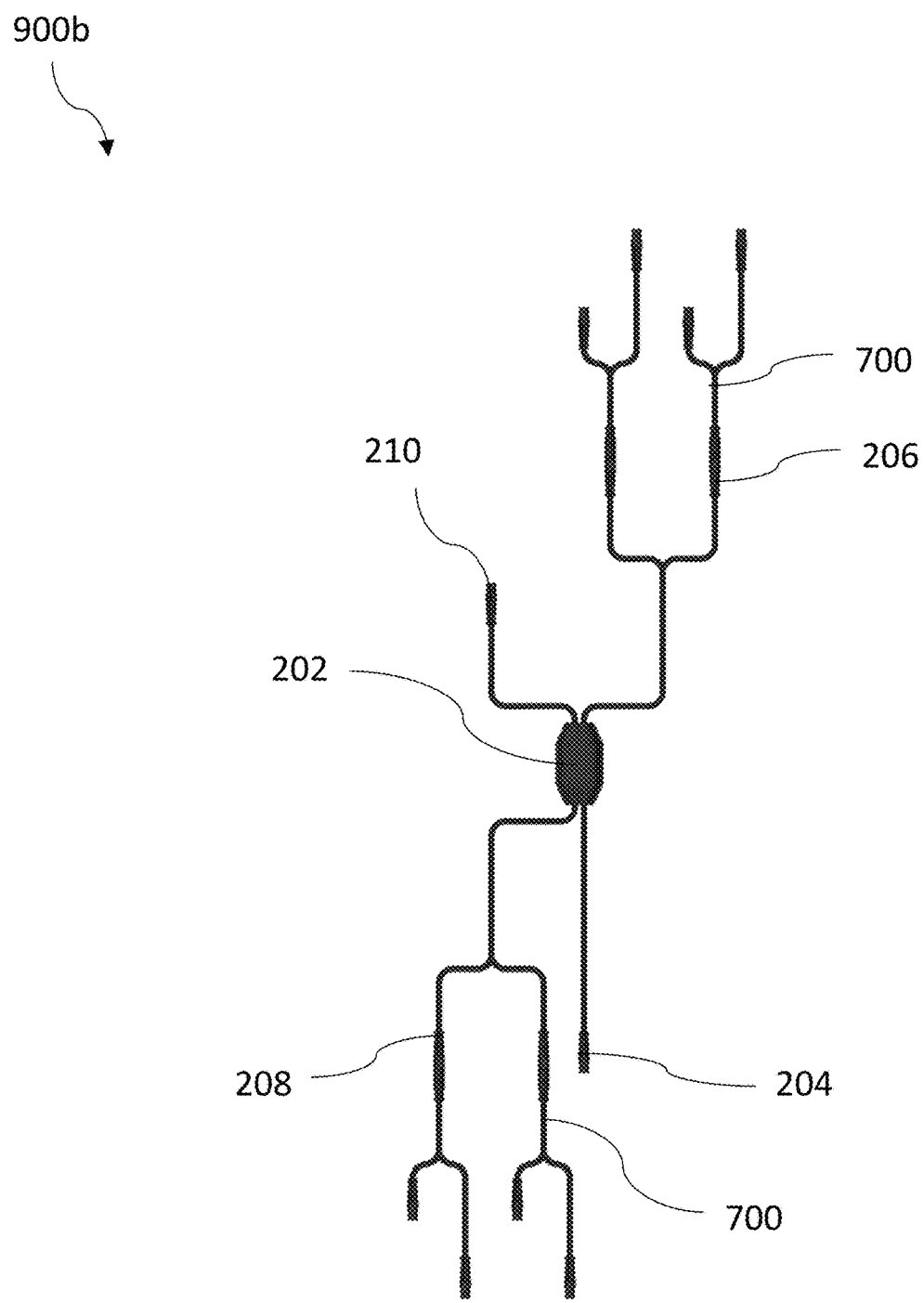

FIG. 14B shows a harness kit 900b. The harness kit 900b is expanded over the harness kit 900a of FIG. 14A with splitter cables 700 connected to the light cable 208 to install four lights at the grille, and with splitter cables 700 connected to the light cable 206 to install four lights at the tail.

Figure 14C:
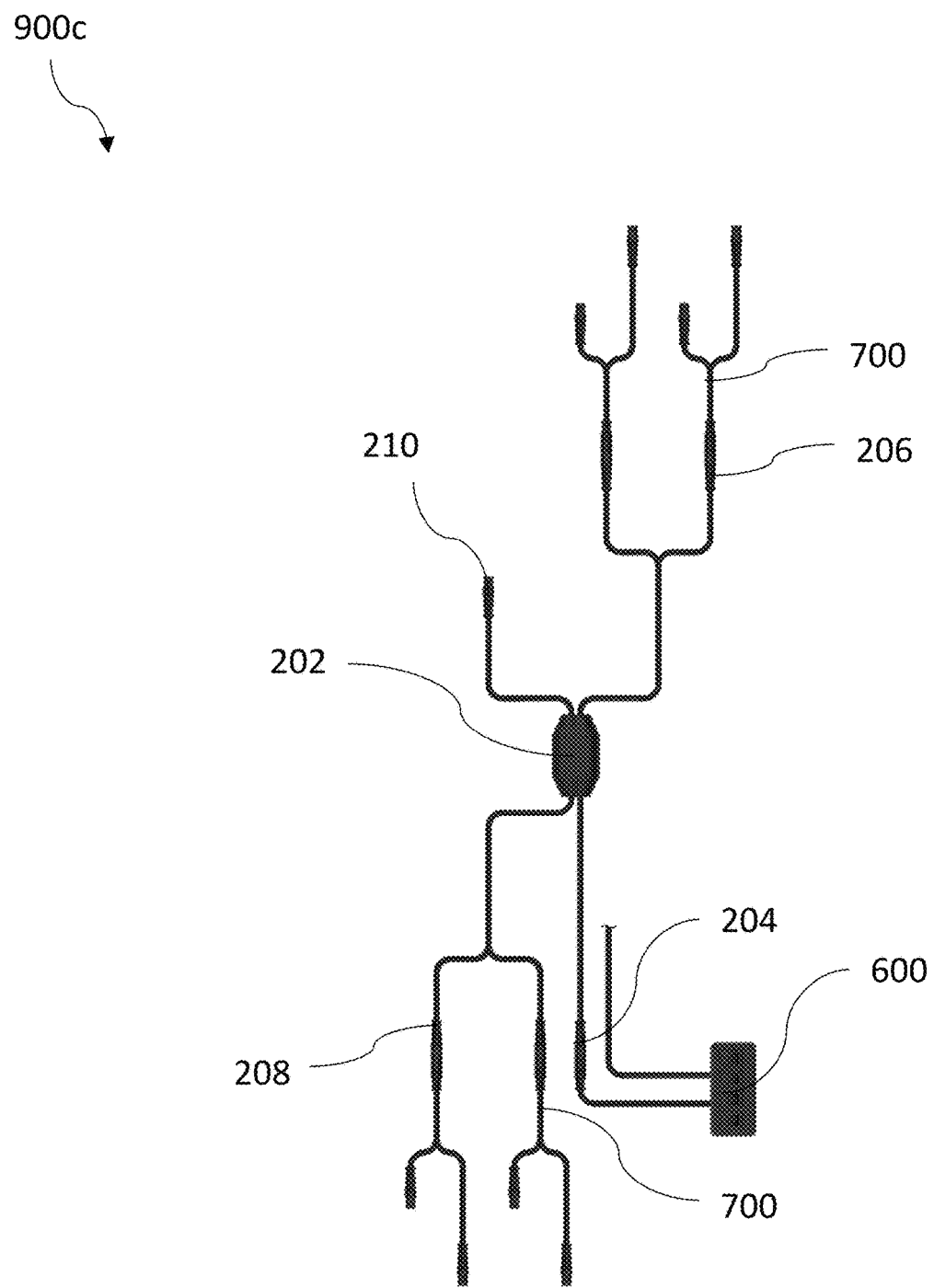

FIG. 14C shows a harness kit 900c. The harness kit 900c is expanded over the harness kit 900b of FIG. 14B with a controller 600 connected to the power cable 204. The controller 600 allows the harness kit 900c to turn on and off the lights and/or to select strobe patterns.

Figure 14D:
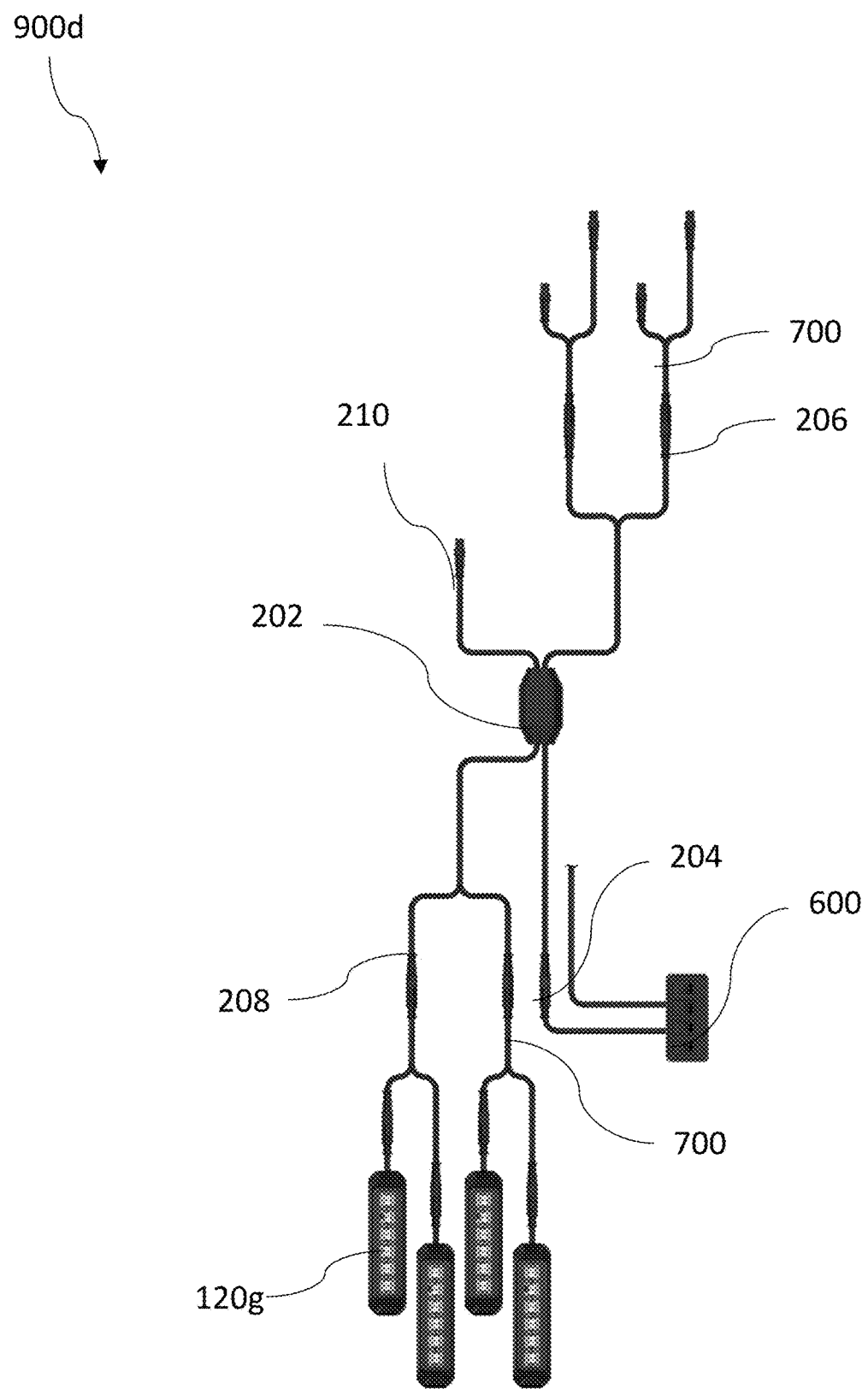
Figure 14E:
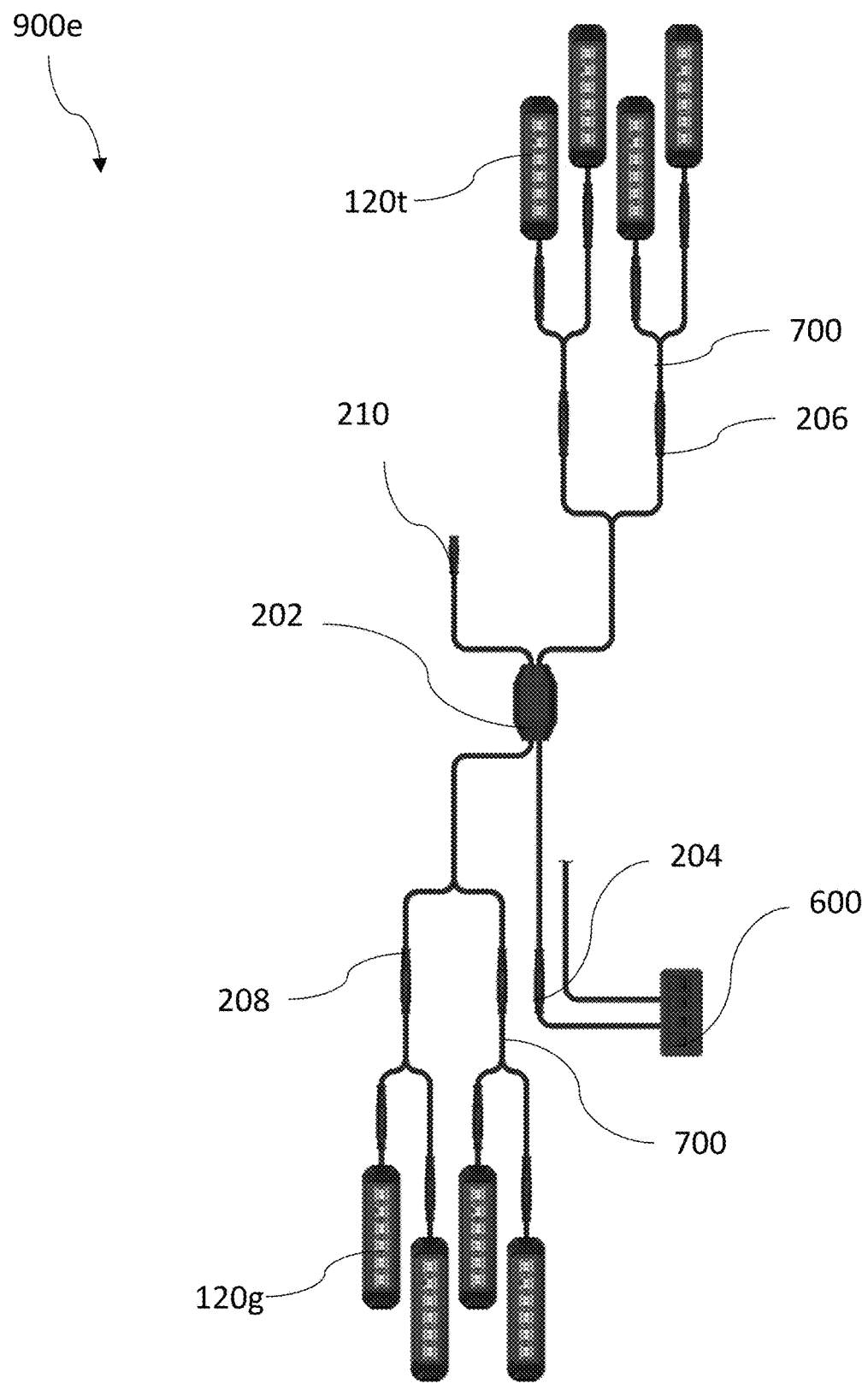
Figure 14F:
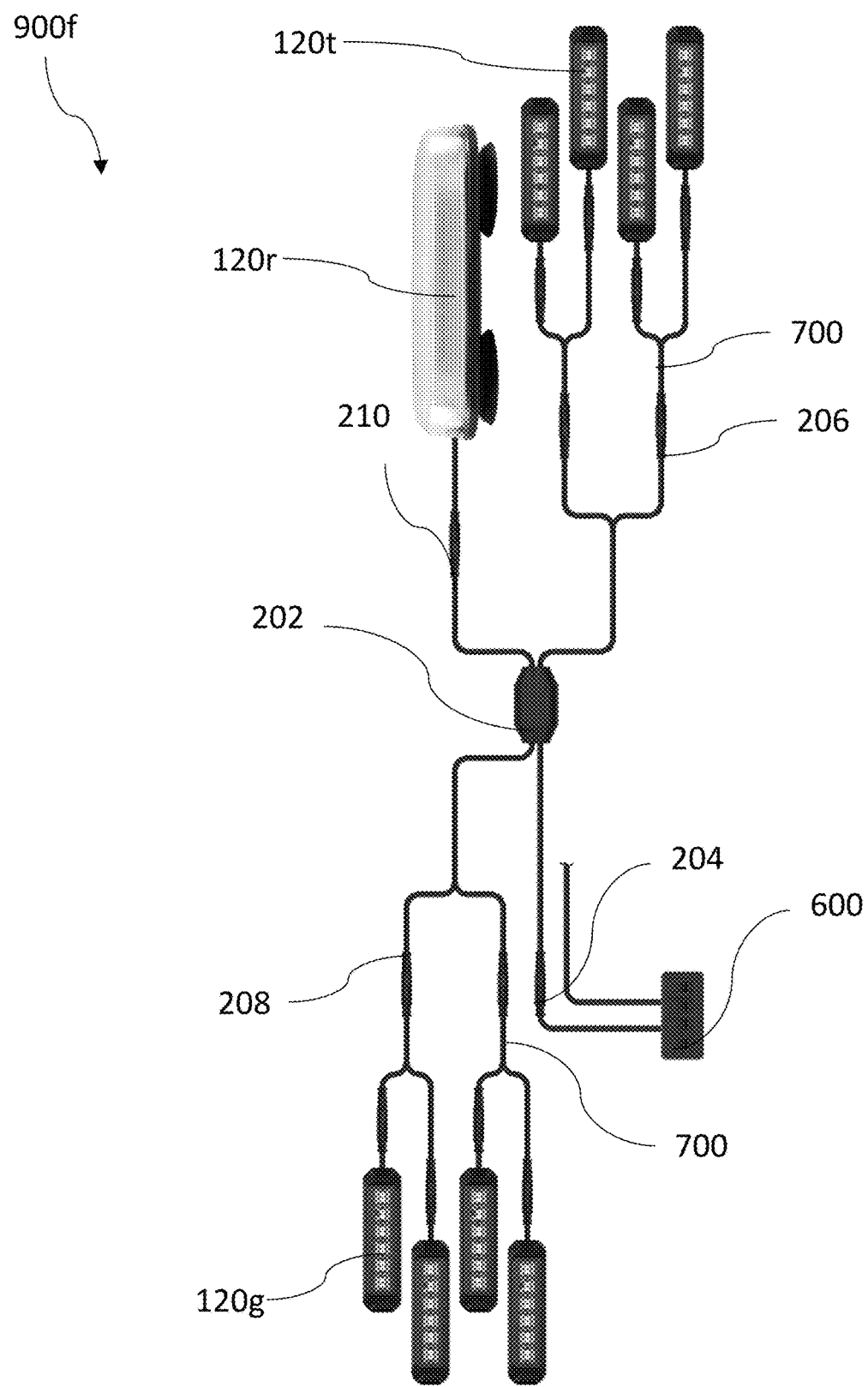

FIG. 14D shows a harness kit 900d. The harness kit 900d is expanded over the harness kit 900c of FIG. 14C with four grille lights 120g. FIG. 14E shows a harness kit 900e. The harness kit 900e is expanded over the harness kit 900d of FIG. 14D with four tail lights 120t. FIG. 14F shows a harness kit 900f. The harness kit 900f is expanded over the harness kit 900e of FIG. 14E with a roof bar 120r.

Embodiments of the present disclosure provide a harness kit for emergency lights, comprising: a junction box; a power cable extending from the junction box; a first light cable extending from the junction box, wherein the first light cable comprises: a proximal end extending from the junction box; and a first modular connector disposed on a distal end of the first light cable, wherein the first modular connector is configured to connect with an emergency light; and a second light cable extending from the junction box, wherein the second light cable comprises: a proximal end extending from the junction box; and a second modular connector is disposed on a distal end of the second light cable, wherein the second modular connector is configured to connect with an emergency light; wherein each of the first light cable, second light cable, and the power cable comprises: a ground wire; a signal wire; and a first function voltage wire, wherein the junction box includes: a ground circuit path connecting the ground wire of the power cable with the ground wires of the first and second light cables; a first voltage circuit path connecting the first function voltage wire of the power cable to the first function voltage wires of the first and second light cables; and a signal circuit path connecting the signal wire of the power cable to the signal wire to at least one of the first and second light cables.

While the foregoing is directed to embodiments of the present disclosure, other and further embodiments of the disclosure may be devised without departing from the basic scope thereof.

The invention claimed is:

1. A harness kit for emergency lights, comprising:
a junction box;
a power cable extending from the junction box;
a first light cable extending from the junction box, wherein the first light cable comprises:
a proximal end extending from the junction box; and
a first modular connector disposed on a distal end of the first light cable,
wherein the first modular connector is configured to connect with an emergency light; and
a second light cable extending from the junction box, wherein the second light cable comprises:
a proximal end extending from the junction box; and
a second modular connector is disposed on a distal end of the second light cable, wherein the second modular connector is configured to connect with an emergency light;
wherein each of the first light cable, second light cable, and the power cable comprises:
a ground wire;
a signal wire; and
a first function voltage wire,
wherein the junction box includes:
a ground circuit path connecting the ground wire of the power cable with the ground wires of the first and second light cables;
a first voltage circuit path connecting the first function voltage wire of the power cable to the first function voltage wires of the first and second light cables; and
a signal circuit path connecting the signal wire of the power cable to the signal wire to at least one of the first and second light cables;
wherein the power cable comprises:
a proximal end extending from the junction box; and
a third modular connector is disposed on a distal end of the power cable;
a controller, wherein the controller comprises:
a switch box;
an input cable extending from the switch box;
an output cable extending form the switch box, wherein a third modular connector is disposed on a distal end of the power cable, the output cable has a fourth modular connector at a distal end, and the fourth modular connector is connected to the third modular connector;
wherein each of the first light cable, second light cable, the power cable, and the output cable of the controller comprises:
a ground wire;
a signal wire; and
a first function voltage wire; and
wherein the input cable comprises:
a positive voltage wire; and
a ground wire.

2. The harness kit of claim 1, wherein the first modular connector and the third modular connector are different.

3. The harness kit of claim 1, wherein each of the first light cable, second light cable, and the power cable comprises a second function voltage wire.

4. The harness kit of claim 3, wherein the junction box further comprises:
a second voltage circuit path connecting the second function voltage wire of the power cable to the second function voltage wires of the first and second light cables.

5. The harness kit of claim 1, wherein the signal circuit path connects the signal wire of the power cable to the signal wires of the first and second light cables.

6. The harness kit of claim 1, wherein the signal circuit path connects the signal wire of the power cable to the signal wire of the first light cable, and the signal wire of the second light cable is floating.

7. The harness kit of claim 6, further comprising:
a signal cable extending from the junction box, wherein the signal cable comprises a first signal wire, and the first signal wire is connected the signal wire of the second light cable.

8. The harness kit of claim 1, wherein the switch box comprises:
a first on-and-off switch connected between the positive voltage wire of the input cable and the first function voltage wire of the output cable; and
a second on-and-off switch connected between the positive voltage wire of the input cable and the second function voltage wire of the output cable.

9. The harness kit of claim 8, wherein the switch box further comprises:
a signal switch connected between the positive voltage wire of the input cable and the signal wire of the power cable.

10. The harness kit of claim 1, further comprising:
a splitter cable comprises:
an input cable; and
two or more output cables, wherein the input cable is configured to connect with the first light cable or the second light cable, and the two or more output cables are configured to connect with two or more emergency lights.

11. The harness kit of claim 10, wherein the two or more output cables have different lengths.

12. The harness kit of claim 10, further comprising a cable retainer disposed over a joint between the input cable of the splitter cable and the first or second light cable.

13. The harness kit of claim 1, wherein the junction box comprises:
a housing defining an inner volume, wherein the proximal ends of the power cable, the first light cable, and the second light cable are disposed in the inner volume.

14. The harness kit of claim 13, further comprising a sealing material disposed in the inner volume.

15. The harness kit of claim 14, wherein the housing includes a plurality of wire organizers.

16. The harness kit of claim 1, further comprising:
a third light cable, wherein the third light cable comprises:
    a proximal end extending from the junction box; and
    a fourth modular connector is disposed on a distal end of the third light cable,
wherein the fourth modular connector is configured to connect with an emergency light.

17. The harness kit of claim 16, further comprising:
a grille light connected with the first light cable;
a tail light connected with the second light cable; and
a roof light connected with the third light cable.

\* \* \* \* \*